US012775935B2

(12) United States Patent

Andon et al.

(10) Patent No.: US 12,775,935 B2

(45) Date of Patent: Oct. 27, 2026

(54) SYSTEMS AND METHODS FOR PROVIDING CONSUMER INTERACTIONS WITH CUSTODIAL DIGITAL WALLET SERVICES FOR BLOCKCHAIN-ENABLED DIGITAL ASSETS

(71) Applicant: NIKE, Inc., Beaverton, OR (US)

(72) Inventors: Christopher Andon, Portland, OR (US); Nicolas Christophe Louis Joseph, Portland, OR (US)

(73) Assignee: Oura, Inc., San Francisco, CA (US)

( * ) Notice: Subject to any disclaimer, the term of this patent is extended or adjusted under 35 U.S.C. 154(b) by 144 days.

(21) Appl. No.: 18/581,372

(22) Filed: Feb. 19, 2024

(65) Prior Publication Data

US 2025/0225505 A1 Jul. 10, 2025

Related U.S. Application Data

(60) Provisional application No. 63/619,228, filed on Jan. 9, 2024.

(51) Int. Cl.

*G06Q 20/36* (2012.01)

*G06Q 20/40* (2012.01)

(52) U.S. Cl.

CPC ....... *G06Q 20/3674* (2013.01); *G06Q 20/401* (2013.01)

(58) Field of Classification Search

None

See application file for complete search history.

(56) References Cited

U.S. PATENT DOCUMENTS

| | | | | |
|---|---|---|---|---|
| 12,496,526 | B1 * | 12/2025 | Li | A63F 13/63 |
| 2010/0057573 | A1 * | 3/2010 | Singhal | G06Q 30/0267 705/14.64 |
| 2019/0205881 | A1 * | 7/2019 | Borzilleri | G06Q 30/018 |
| 2022/0016529 | A1 * | 1/2022 | Meilich | H04L 63/123 |
| 2022/0182368 | A1 | 6/2022 | Madisetti et al. | |

(Continued)

OTHER PUBLICATIONS

"How to buy an NFT", OpenSea, Aug. 22, 2022, Retrieved from the Internet: URL:https://opensea.io/learn/nft/how-to-buy-nft.

(Continued)

*Primary Examiner* — Jamie R Kucab

(74) *Attorney, Agent, or Firm* — Quinn IP Law

(57) ABSTRACT

Presented are computing systems for regulating the custody and transfer of digital assets, methods for making/using such systems, and memory-stored, computer-readable instructions for provisioning such systems. A method for governing control of digital assets includes a host platform's server receiving, from a user's personal computing device, a request to transfer a cryptographic digital asset from a custodial wallet provisioned by a third-party wallet platform. In response, the host server receives, from the third-party wallet platform's server, an encrypted private key enabling access to the custodial wallet. The private key is decrypted and used to create an encrypted transfer request by generating a transfer request to transfer the cryptographic digital asset from the custodial wallet to a new digital wallet and encrypting the transfer request. The host server transmits, to the third-party server using the encrypted transfer request, a transfer order to transfer the cryptographic digital to the new digital wallet.

12 Claims, 9 Drawing Sheets

(56) References Cited

U.S. PATENT DOCUMENTS

| | | | |
|---|---|---|---|
| 2022/0237595 A1 | 7/2022 | Roach et al. | |
| 2023/0066424 A1* | 3/2023 | Silver | G06Q 30/0269 |
| 2024/0296442 A1* | 9/2024 | Spivack | G06Q 20/4014 |
| 2025/0343768 A1* | 11/2025 | McLaughlin | H04L 47/822 |

OTHER PUBLICATIONS

Gloria Chinemerem Chimelu, "How to Store NFTs", Apr. 18, 2023, Retrieved from the Internet: URL:https://web.archive.org/web/20230603174710/https://www.investopedia.com/how-to-store-nfts-7378259#toc-how-to-store-nfts.

Fangdong Zhu et al: "Trust Your Wallet: a New Online Wallet Architecture for Bitcoin", 2017 International Conference on Progress in Informatics and Computing (PIC), Dec. 15, 2017, pp. 307-311, DOI: 10.1109/PIC.2017.8359562, retrieved on May 15, 2018.

* cited by examiner

SYSTEMS AND METHODS FOR PROVIDING CONSUMER INTERACTIONS WITH CUSTODIAL DIGITAL WALLET SERVICES FOR BLOCKCHAIN-ENABLED DIGITAL ASSETS

CROSS REFERENCE TO RELATED APPLICATIONS

The present disclosure claims the benefit of priority from U.S. Provisional Patent No. 63/619,228, filed on 9 Jan. 2024, which is incorporated by reference in its entirety.

TECHNICAL FIELD

The present disclosure relates generally to fungible and non-fungible digital assets. More particularly, aspects of this disclosure relate to computing systems and logic for providing consumer interactions with custodial digital wallet services for blockchain-enabled digital assets.

BACKGROUND

A non-fungible token (NFT), as the name implies, is a unique and non-interchangeable digital asset that is recorded on a blockchain ("tokenized") and are oftentimes designed to be resold or traded between different market participants. NFTs may take on different use cases, including certifying ownership of or license rights to use a related or linked asset(s) or content (e.g. music, art, media, avatars/characters, wearables, etc.), For instance, an NFT can serve as a digital certificate of authenticity and proof of ownership (or license rights) for a corresponding digital or physical good (or both when used in combination with NFC tags on physicals connected to/linked with NFTs,) such as a pair of shoes or a digital representation of a pair of shoes. An NFT is a digital record with an encrypted identifier code that is recorded on an immutable digital ledger, such as a blockchain-style ledger, which can be broken up across many different nodes or ledger-maintaining participants. Such blockchain ledgers employ cryptographic hash functions (CHFs) to encode and map select portions of the NFT record while also referencing the prior block (in the chain of blocks) to provide continuity in a chain of possession. Blockchain technology with NFTs can therefore provide users with provenance and ownership/rights credentials, which can then be used to "unlock" access rights to associated licensed content and/or experiences.

NFTs are digital identifiers that can include elements, such as, identifier information (public and private keys), a connection to blockchain computer programming "smart contract" that assigns NFT ownership to a first owner (via "minting") and governs the process for the NFT ownership transfer, use, activation/deactivation, properties, and metadata. Metadata for a basic profile picture (PFP) NFT, for example, may contain a title, a description, creator attribution, blockchain details such as links to the "smart contract" address, token ID, token standard (e.g., ERC-721 or ERC-1155,) chain information (e.g., Etherium, Polygon, etc.), date of last update, secondary royalty rates (e.g. royalties due to the creator/IP owner for obtaining license rights to related content based on NFT ownership,) and functional link(s) (e.g., a Universal Resource Identifier (URI)) to a digital image, license/legal agreement, etc. stored on centralized (e.g., AWS instances managed by a company) or decentralized servers (e.g., IPFS storage on the blockchain) Due to complexities associated with pushing large amounts of data through a blockchain's transaction validation process, as noted above, the metadata of an NFT may often include a pointer or reference to separate on-chain or off-chain data/digital files, such as licensed related content including photos, graphics, videos, and/or audio content. When digital content associated with an NFT is displayed, such as on a user's social media account or in a user's digital wallet, an associated software program may review the metadata and digitally retrieve the associated photo from the referenced file repository for display.

SUMMARY

The present disclosure generally describes a system and method that allows companies to facilitate consumer transactions of blockchain-based digital assets like non-fungible tokens (NFTs) without taking on custodial responsibilities or liabilities for holding the assets. Under current regulatory guidance, companies that hold the private cryptographic keys to digital wallets (with digital assets) on behalf of consumers must account for those digital assets as financial liabilities on their balance sheet due to the risks and uncertainties involved. Custodial wallets can offer support functions from a custodial wallet provider company for any issues a user may have with their digital wallet with digital assets, and therefore be desirable for some consumers, especially ones newer to blockchain-based digital assets. Many consumers may have a first experience with blockchain-based digital assets with a consumer company they trust, but not be familiar or comfortable with digital wallets and the technology learning and onboarding involved with self-custodial digital wallets. Additionally, self-custodial wallets can be scary to some as they offer no support when being locked out from your digital wallet because of a forgotten password or connecting your digital wallet to nefarious parties and losing your assets. To facilitate onboarding consumers to blockchain-based digital assets, it can be beneficial to ease a consumer's first digital asset experience by facilitating a simplified process of getting a custodial digital wallet from a custodial wallet provider and a first digital asset from a separate consumer company. However, while many companies want to enable consumers to acquire, trade, and utilize blockchain-based digital assets with custodial wallets (instead of self-sovereign wallets,) the companies also don't want to take on any custodial accounting complexities or compliance uncertainties themselves.

The present disclosure solves this problem via a system that coordinates the use of a specialized third-party digital asset custodian company with a consumer company's website and operations. When a consumer buys an NFT from the consumer company's website, the system can automatically connect the consumer with a custodial company partner to create a custodial wallet for the consumer and then directly mint/transfer the NFT to the consumer's custodial wallet without the company ever directly holding the asset or having access to the private keys of the consumer's newly created custodial wallet. Through this system, the consumer can access the custodial wallet using a simple password. The company's website facilitates interactions between the user, their custodial wallet, and the custodian through "arm's length" encrypted communications, allowing the user to view, trade, and utilize their NFTs while keeping the company separated and isolated from being a custodian and having any view or control of the private keys to the consumer's custodial wallet with the custodial company.

The present technology allows mainstream consumer brands to offer NFTs and blockchain collectibles to customers without needing to build out custodial crypto infrastructure themselves, take on custodial financial compliance obligations, or make consumers have to use self-custodial wallets. It provides a smoother user experience while also reducing accounting uncertainties and compliance risks related to holding blockchain assets on the company's own balance sheet. The custodial partner assumes these duties instead. Overall, this system serves as a bridge between consumers, blockchain technology, and legacy businesses in a legally compliant way.

In some embodiments, the presently described system utilizes an end-to-end encrypted (E2E) wallet protocol to facilitate interactions between the user, the company's host platform, and the user's custodial wallet while keeping the host platform functionally isolated from the consumer's custodial wallet. All communications relay through the user's web browser or app rather than directly between servers.

When the user wants to trade an NFT, they may enter their wallet password into their browser, which decrypts their private key locally and signs a transaction request. This encrypted approval is forwarded to the host platform and on to the custodial wallet platform to authorize transfer without the host platform ever gaining access to private keys. In some embodiments, the custodial platform may utilize advanced cryptographic protocols like multiparty computation (MPC) or threshold signature schemes (TSS) to divide up signing duties for additional security, while still allowing the user to access their custodial wallet with a simple password.

By leveraging a custodial crypto wallet & services provider and E2E browser protocols, the host platform (e.g., a platform run by a mainstream consumer company) may get a turnkey solution for offering blockchain-based digital collectibles to consumers, without i) holding consumers' digital collectibles/assets on the company's balance sheet because of custodial compliance requirements, ii) managing custodial wallet infrastructure, and/or iii) having to direct consumers unfamiliar to the space to self-custodial wallets. Utilizing the technologies disclosed, users get simplified access to blockchain-based digital assets/collectibles without needing experience with the complexity of crypto self-custody and related operations. Overall, this technology is operative to provide mainstream consumer brands the ability to interact with consumers involving blockchain-based capabilities in a custodial compliant way, without the mainstream consumer brand being a custodian, thus expanding blockchain-based digital assets/collectibles accessibility and adoption.

In view of this, presented herein are centralized and decentralized computing systems for providing consumer interactions with custodial digital wallet services for blockchain-enabled digital assets, methods and control logic for operating such systems, and non-transient computer-readable code for such systems. In an example, many of the presently described features are directed to systems and methods for facilitating consumer interaction with custodial digital wallet services and blockchain technology to enable consumer control over blockchain-enabled digital assets. Many consumers, being new to blockchain-enabled digital assets, are not comfortable with the level of personal responsibility and control required of themselves that come with self-sovereign identity (SSI) wallets. In general, a self-sovereign identity wallet is a type of digital wallet in which individuals have the sole ownership/control over their accounts—meaning there is generally no entity or person to go to for help if that consumer loses or forgets their password or, for that matter, wishes to change their password. As such, custodial wallets—and services for interacting with such custodial wallets—are now offered by companies to provide consumers with the benefits of blockchain-enabled digital asset storage along with the level of help and comfort common to regular asset control companies, such as bank accounts with banking entities and the like. As companies and their attendant brands begin to onboard consumers into blockchain-enabled digital assets, there is a need for simplified consumer onboarding into blockchain that does not require a consumer to have to first set up their own self-sovereign wallets and acquire cryptocurrency in order to acquire a first blockchain-enabled digital asset from a company/brand.

A solve for the aforementioned need may include company partnership with custodial wallet providers, whereby a consumer creates a custodial wallet with a custodial wallet provider at the time of requesting/ordering a blockchain-enabled digital asset from a company/brand's website services. The consumer may be prompted to agree to terms with the custodial wallet provider (e.g., an end-user license agreement (EULA)) that has partnered with the company/brand to first create a custodial wallet for the consumer. The consumer may also be prompted to agree to separate user terms with the company/brand issuing the digital asset for that digital asset to be sent to the consumer's custodial wallet. Via partnership between the custodial wallet provider and the company, the consumer is able to create their own private passphrase to interact with their custodial wallet. It may be desirable that the company/brand have no access to this private passphrase or the custodial wallet managed by the custodial wallet provider, and therefore is separated from any control or access to the consumer's custodial wallet or the blockchain-enabled digital assets associated with such custodial wallet. To provide the consumer with interactive services with their custodial wallet, while also being fully separate from the consumer's passphrase and custodial wallet, there is a need for a web services framework to keep this separation while still enabling a consumer the interactive services through the company/brand's website, so as to simplify the consumer experience, even though the brand/company website and the custodial wallet are operated by distinct entities with which the consumer has separate relationships and terms.

Unlike typical digital assets that are freely reproducible without the consent or control of the originator, the use of blockchain recordation of ownership may be implemented to restrict or eliminate the ability for simple digital reproduction of digital assets. In doing so, the originator is able to control or limit the overall supply of the digital assets and their traits, and may engender controlled scarcity if desired. In some non-limiting examples, a digital asset (or "object") may be representative of a physical good, a digital image or design rendering of a physical good, a digital collectable, a two-dimensional (2D) or three-dimensional (3D) design rendering or design file that may be suitable for future production, a virtual representation of an object that is not presently intended for physical creation/production, or any combination thereof. To further promote customer engagement and brand awareness, the visual expression and other attributes of a digital asset may be altered by a user, and the user may import and export digital assets across a myriad of heterogenous virtual platforms. For instance, the visual characteristics of a digital shoe or apparel may be adapted for transfer to and use in a virtual platform, such as virtual reality (VR), augmented reality (AR), or video game (VG) context.

By way of example, and not limitation, there are presented cryptographic digital assets that are secured through a blockchain ledger of transaction blocks. These digital assets may function solely as a limited-release digital collectable or, if desired, to connect a real-world product, such as a physical shoe, to a digital collectible, such as a digital shoe. In some embodiments a digital representation of a shoe may be generated or retrieved and assigned a cryptographic token, where the digital shoe and cryptographic token may collectively represent a "CryptoKick" (CRYPTOKICKS®). The digital representation may include a 2D or 3D digital rendering, a computer-generated avatar, or an artist rendition of the shoe. The digital asset may be secured by an encryption-protected block/record that contains a transaction timestamp, transaction data, and a hash pointer as a link to a related block/record (e.g., genesis block or prior transacted block) in a decentralized blockchain. Using the digital asset, the creator and/or owner may store the digital shoe in a cryptographic wallet or other digital blockchain locker, intermingle or alter the digital shoe, and/or have an intermingled/modified shoe custom made as a new, tangible pair of shoes (e.g., as limited by a predetermined rule set of acceptable shoe manufacturability defined by a manufacturer).

A digital asset, in at least some applications, may contain attribute information that defines visual, audible, and/or other characterizing traits for that asset. This attribute information may represent content, size, color, style, fixity, reference, provenance, context, etc., of the digital asset, and may be coordinated according to predefined rules that govern altering of that digital asset. Altering of a digital asset may depend on any one or more of: (1) a current or initial virtual environment and attendant effects; (2) an intended or future virtual environment and attendant effects; (3) time-dependent restrictions (e.g., cannot alter asset after 30-day window); (4) creator-established restrictions (e.g., can only alter limited characteristics of asset); (5) destination-established restrictions (e.g., game creator limitations on asset type and alterations); (6) origination-established restrictions (preset maximum number of alterations), etc. Some optional features may also include: consignment rule sets delineating the actions and services that may be taken/afforded by a third-party entity that holds but does not own a digital asset; destination rule sets delineating the ability of a desired destination platform to make/use/alter a digital asset; manufacturer's rule sets containing manufacturing restrictions that delineate allowable alterations to a digital asset; physical product rule sets delineating the ability of each successive owner of a digital asset to modify a digital asset based on an original, real-world good (e.g., via encryption key to the originally associated virtual product), etc.

Also discussed below are systems, methods, and logic for a host company/brand platform ("host platform")—acting, in part, as a middleware service—to partner with a third-party custodial wallet provider company for the partner provider to create a custodial wallet for a consumer ("host platform user"). The partner provider enables the host platform user to use a single-password service for accessing and interacting with their custodial wallet and its contents from either the host platform or the third-party platform. As noted above, it may be preferred that the host platform neither maintains nor has direct access to the cryptographic key information necessary to access the crypto-asset in a digital wallet. Therefore, with the present technology, the host platform, while keeping the wallet and password services fully "at arm's length" and completely separate from the company/brand, may enable host platform users to receive and/or mint cryptographic digital assets, as well as enable consumer interaction with their third-party hosted custodial wallet to transfer digital assets to other wallets.

The custodial wallets maintained by the third-party platform may have a single, user-created wallet password that enables wallet "signing" interactive capabilities to access and interact with the user's custodial wallet. In so doing, transactions are signed directly with the third-party and the host platform is removed from any obligations implicit in the maintenance and preservation of the custodial wallet, including the user's password, the cryptographic keys to the wallet, and any other wallet services, as the consumer is fully in a direct business relationship with custodial wallet third-party provider for such services. This setup, however, may require a browser-based technology solution to define how the consumer can interact with their custodial wallet separate from the host platform, so as to operate similar to a self-sovereign wallet browser extension (e.g., like a MetaMask wallet browser extension). Such a solution may help to ensure that the host platform is never a party to password and signing activities of the consumer when interacting with their custodial wallet.

There are other more complicated solutions for how to deal with this problem of enabling custodial wallet services and ensuring separation from outside parties to be between the custodial wallet provider, the custodial wallet, and the consumer. For a single-password custodial wallet, the third-party crypto wallet platform or a software application operating on the user's personal computing device may employ a secure multi-party computation (MPC) cryptographic protocol in which a private key associated with a custodial wallet is parsed into multiple encrypted shares and maintained by a constrained set of parties. When the private key is needed (e.g., to sign a message verifying a user has token access to authorize transfer of an NFT to/from a custodial wallet), a "secret sharing" function of the MPC is performed to confirm that some or all of the responsible parties approve the request. FIREBLOCKS™, for example, offers an MPC wallet as a service solution.

As another option, the wallet platform or software application may employ a multilayer QREDO® decentralized MPC (dMPC) in which private key management and asset control is further secured by creating multiple independent key "secrets" that are distributed between MPC Nodes on a fast-finality blockchain. Each node independently generates its own "secret key" information that is protected in a discrete secure environment. To facilitate control of access and instant settlement between network participants, the dMPC encryption is combined with Qredo's Layer 2 blockchain. As yet another option, the wallet platform or software application may employ a Threshold Signature Scheme (TSS) protocol for generating a single digital signature from multiple independent signatories for an MPC wallet. A TSS protocol replaces the KeyGen step (generation of a public and private key pair) and Sign Algorithm step (generate signature when given message and private key) of a digital signature method with an interactive protocol that distributes the generation of key shares and signing across multiple parties that create the signature. For instance, BITGO™ offers a TSS wallet as a service solution that, when combined with technologies described herein, offers solutions that solve for not adding extra complexity to a situation in which a host platform's goal is to enable a consumer to utilize blockchain enabled digital assets in the simplest way possible, while also keeping the host platform separate from any custodial relationship/situation.

Aspects of this disclosure are directed to centralized and decentralized computing systems for providing consumer interaction with custodial digital wallet services for blockchain-enabled digital assets, methods and control logic for operating such systems, and non-transient computer-readable code for such systems. More specifically, many of the presently described features employ systems and methods for consumer interaction with custodial digital wallet services and blockchain technology to enable consumer control over blockchain enabled digital assets. In an example, a method is presented for governing control of digital assets. This representative method includes, in any order and in any combination with any of the above and below disclosed features and options: receiving, e.g., over a distributed computing network via a server-class computer of a host platform from a dedicated software application (app) operating on a personal computing device of a user, a request to transfer a cryptographic digital asset from a custodial wallet provisioned by a third-party wallet platform; receiving, e.g., via the host server from a server-class computer of the third-party wallet platform responsive to receiving the transfer request, an encrypted private key that enables access to the custodial wallet; decrypting, e.g., via the app or third-party platform server, the encrypted private key using at least a passphrase input by the user; creating, e.g., via the app or third-party platform server using the decrypted private key, an encrypted transfer request by generating a verified transfer request to transfer the cryptographic digital asset from the custodial wallet to a new digital wallet and, once generated, encrypting the verified transfer request; and transmitting, e.g., via the host server over the distributed computing network to the third-party server using the encrypted transfer request, a transfer order to transfer the cryptographic digital asset from the custodial wallet to the new digital wallet.

Other aspects of this disclosure are directed to decentralized computing systems with attendant control logic for minting, securely storing, and exchanging blockchain-secured digital assets. As an example, a decentralized computing system is presented for governing control of digital assets. The decentralized computing system includes a downloadable dedicated software application (e.g., mobile app) that operates on a user's personal computing device, and a wired or wireless communications device that communicatively connects to a server-class computer of a third-party wallet platform over a distributed computing network (e.g., the internet). The computing system also includes a server-class (middleware or backend) computer that exchanges data with the software application and the third-party wallet platform via the communications device.

Continuing with the discussion of the preceding example, the host-system server computer is programmed, e.g., to execute memory-stored firmware and/or software residing on a server database, to communicate over the distributed computing network with the software application and receive therefrom a request to transfer a cryptographic digital asset from a custodial wallet provisioned by the third-party wallet platform. Responsive to receiving the transfer request, the host-system server computer prompts and retrieves from the third-party wallet platform's server computer an encrypted private key that enables access to the custodial wallet. The dedicated software application decrypts the encrypted private key using a passphrase input by the user and, using the decrypted private key, creates an encrypted transfer request. The encrypted transfer request is created by first generating a verified transfer request to transfer the cryptographic digital asset from the custodial wallet to a new digital wallet, and then encrypting the verified transfer request. Using the encrypted transfer request, the host system's server transmits a transfer order to the third-party server to transfer the cryptographic digital asset from the custodial wallet to the new digital wallet.

Further aspects of this disclosure are directed to non-transitory computer-readable media (CRM) that store instructions executable by a system server of a host system or a software application operating on a user's personal computing device. These instructions, when executed, cause at least the following operations: receiving, over a distributed computing network via the host server from the software application, a request to transfer a cryptographic digital asset from a custodial wallet provisioned by a third-party wallet platform; receiving, via the host server from a third-party server of the third-party wallet platform responsive to receiving the transfer request, an encrypted private key enabling access to the custodial wallet; determining, via the software application, a decrypted private key by decrypting the encrypted private key using a passphrase input by the user; determining, via the software application using the decrypted private key, an encrypted transfer request by generating a verified transfer request to transfer the cryptographic digital asset from the custodial wallet to a new digital wallet and encrypting the verified transfer request; and transmitting, via the host server to the third-party server using the encrypted transfer request, a transfer order to transfer the cryptographic digital asset from the custodial wallet to the new digital wallet.

For any of the disclosed systems, methods, CRM, and digital assets, the host server may communicate with the third-party server to receive therefrom an unencrypted public key that enables transfers to/from the custodial wallet. In this instance, the host system's server may use the unencrypted public key to generate the transfer order. As a further option, the host server may decrypt the encrypted transfer request using the unencrypted public key for the custodial wallet. Once decrypted, the host system's server may retrieve select message content within the decrypted transfer request; the transfer order may be generated using the retrieved select message content. Optionally, the transfer order may include a smart contract that assigns ownership of a unique digital token of the cryptographic digital asset to a respective user of the new digital wallet.

For any of the disclosed systems, methods, CRM, and digital assets, the subroutines for determining the decrypted private key and determining the encrypted transfer request may be carried out via the dedicated software application that is operating on the user's personal computing device. Moreover, the encrypted transfer request may be transmitted from the software application on the personal computing device to the host server of the host platform. In this instance, the transfer request and the passphrase are received from the user via the software application while operating on the personal computing device. As a further option, the encrypted private key is received by the host system's server from the third-party wallet platform's server and passed through the host server to the software application without the host server taking custodial possession of or accessing the encrypted private key.

For any of the disclosed systems, methods, CRM, and digital assets, the private key may be encrypted using a secure MPC cryptographic protocol that parses the encrypted private key into multiple encrypted key shares and distributes each encrypted key share to a respective party within a constrained set of parties. In this instance, the encrypted private key may be decrypted by executing an MPC secret sharing function during which some, but not all, of the encrypted key shares are shared amongst the respective parties within the constrained set and at least a predefined minimum number of these respective parties approves the decryption. As a further option, the secure MPC cryptographic protocol may include a multilayer dMPC protocol with a Layer 2 blockchain on which is recorded possession information, transaction records, and governance approvals of the encrypted key shares of the parsed encrypted private key. The secure MPC cryptographic protocol may also include a Threshold Signature Scheme protocol for generating a single digital signature from respective signature segments provided by the respective parties with the encrypted key shares.

The above Summary does not represent every embodiment and every aspect of this disclosure. Rather, the foregoing summary merely provides a synopsis of some of the novel concepts and features set forth herein. The above features and advantages, and other features and attendant advantages of the disclosure, will be readily apparent from the following Detailed Description of illustrated examples and representative modes for carrying out the present disclosure when taken in connection with the accompanying drawings and the appended claims. Moreover, this disclosure expressly includes any and all combinations and sub-combinations of the features presented above and below.

Figure 1:
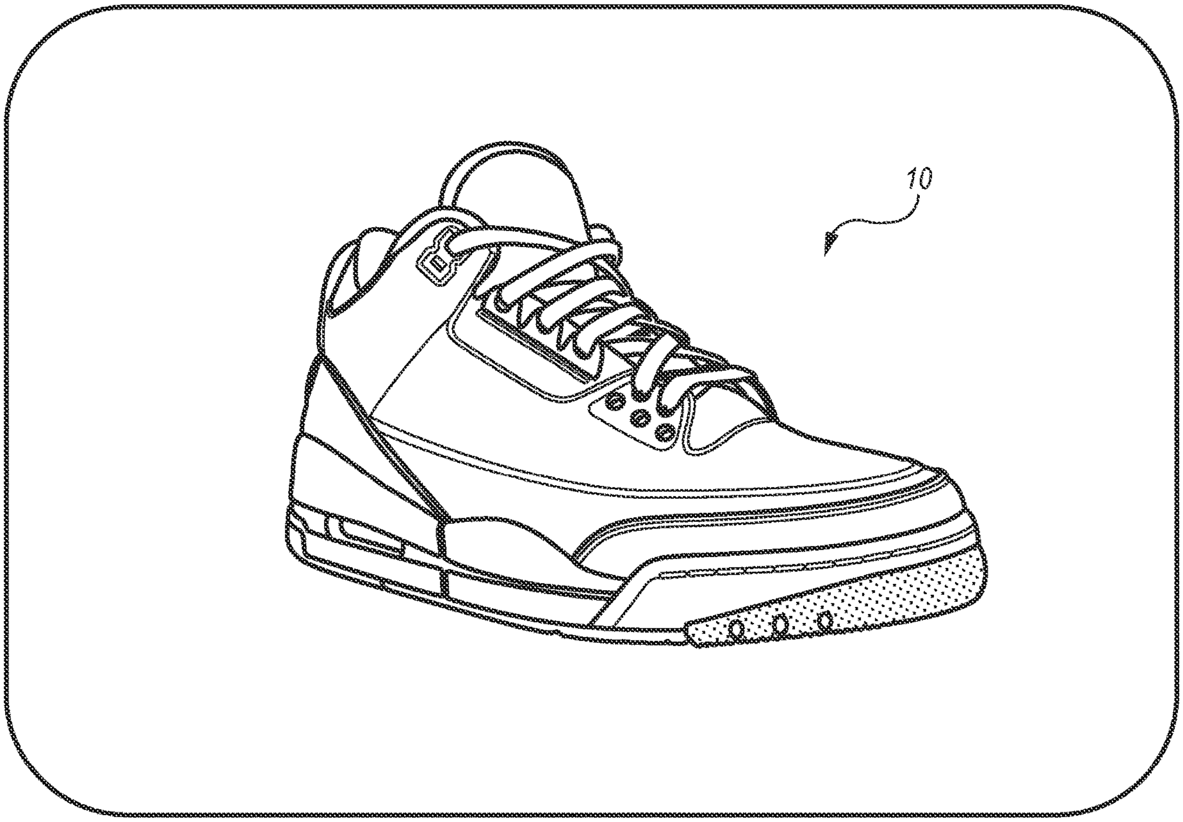
FIG. 1 is a perspective-view illustration of a representative article of footwear that is associated with a digital asset protected by a cryptographic token that is secured by a blockchain ledger in accordance with aspects of the present disclosure.

This disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for example, by the appended claims.

DETAILED DESCRIPTION

The present disclosure generally relates to a technology that makes it easier for mainstream consumers to acquire and utilize blockchain-based digital assets like NFTs, without needing to hold cryptocurrencies and/or directly possess existing self-custodial digital wallets. This technology enables companies to offer NFTs and other blockchain enabled items to broader consumer populations who may otherwise find it complicated to maintain a crypto wallet or acquire/hold cryptocurrency.

In a general sense, the present technology works by letting a company (i.e., the operator of the "host platform") partner with a specialized crypto custodial wallet provider to provide embedded services to a user/consumer/customer. When the user/consumer/customer engages to buy an NFT or other blockchain item through the host company's website, the host platform may be configured to connect the consumer to a partner specialized crypto custodial wallet provider to create a secure custodial crypto wallet for the user via the wallet partner that can be accessed by the user with a simple password-type login interaction. This custodial wallet provider's hosted wallet then can hold the user's purchased NFTs, tokens, blockchain-secured digital collectables, etc. The host company facilitates interactions between the user and the custodial wallet partner so that the user can view the items in their wallet directly on the host website, however, the user's private cryptographic keys stay entirely with the custodial wallet provider. In this manner, the user gets a seamless experience of acquiring and using blockchain-based digital items while engaging with the host company platform/website, without the need to understand crypto wallets or technology. This technology removes hurdles for mainstream user adoption of blockchain items by simplifying the acquisition and subsequent transfers of blockchain items. Additionally, the host company reduces their own liability and accounting complexity by not being in direct or indirect custodial control of the user-acquired items (i.e., where custody is often view synonymously with access to, or possession of the user's private cryptographic key).

This disclosure is susceptible of embodiment in many different forms. Representative examples of the disclosure are shown in the drawings and will be described in detail herein with the understanding that these representative examples are provided as an exemplification of the disclosed principles, not limitations of the broad aspects of the disclosure. To that extent, elements and limitations that are described in the Abstract, Technical Field, Background, Summary, and Detailed Description sections, but not explicitly set forth in the claims, should not be incorporated into the claims, singly or collectively, by implication, inference or otherwise. Moreover, recitation of "first", "second", "third", etc., in the specification or claims is not per se used to establish a serial or numerical limitation; unless specifically stated otherwise, these designations may be used for ease of reference to similar features in the specification and drawings and to demarcate between similar elements in the claims.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "comprising," "having," "containing," and the like shall each mean "including without limitation." Moreover, words of approximation, such as "about," "almost," "substantially," "approximately," and the like, may be used herein in the sense of "at, near, or nearly at," or "within 0-5% of," or "within acceptable manufacturing tolerances," or any logical combination thereof, for example. Lastly, directional adjectives and adverbs, such as fore, aft, medial, lateral, proximal, distal, vertical, horizontal, top, bottom, front, back, left, right, etc., may be with respect to an article of footwear when worn on a user's foot and operatively oriented with a ground-engaging portion of the sole structure seated on a flat surface, for example.

Aspects of this disclosure are directed to computer-generated digital/virtual assets, such collectible digital shoes (e.g., "CryptoKicks" or "CK"), that, in some instances, may be secured and/or uniquely identified by a cryptographic token and may be linked and/or distributed with real-world, physical products, such as tangible shoes. In some applications, instead of being linked to or distributed with real-world, physical products, the digital asset may be linked to or distributed with a 2D or 3D design file, such as a CAD model, graphical rendering, image, video, or drawing package from which a physical product may be constructed or otherwise represented.

Various digital assets may be used by a company, for example, to stay apprised of consumer trends and preferences. For instance, a company may create a number of product-ready designs with different traits, silhouettes, colors, and the like, and may distribute them across one or more digital platforms as digital assets, and may then monitor the popularity, value, demand, and/or virtual use of different product designs and traits. In doing so, the company may gain a valuable understanding of the real-time demand for a product, which may be helpful when prioritizing designs for future manufacturing.

A digital asset may be created and disseminated, for example, for brand promotion purposes. A digital shoe may be created, for example, in a preset and/or controlled limited quantity and distributed as part of a promotion, an event, a game, or a contest. For instance, spectators at a professional sporting event (e.g., a home opener) may be given the right to acquire one of a limited quantity of unique digital assets, each being separately secured via its own cryptographic token.

As used herein, a "digital asset" may refer to any computer-generated virtual object, including digital footwear, apparel, headgear, eyewear, avatars, pets, images, sounds, videos, etc. Comparatively, use of the term "cryptographic digital asset" may be in reference to a digital asset that is protected by a unique, non-fungible tokenized code ("token") registered on and validated by a blockchain platform or otherwise registered in an immutable database. Furthermore, all references to "CryptoKicks" and variations thereof within this disclosure should be understood to be exemplary of a cryptographic digital asset backed by a unique, non-fungible token (NFT) or registry entry within an immutable database and, thus, are not per se limited to footwear. All such references should be read to equally apply to apparel (e.g., "CryptoThreads"), headgear (e.g., "CryptoLids"), and sporting equipment (e.g., "CryptoGear"), or other such objects.

A virtual object may have multiple attributes that may be derived, at least in part, from an encrypted alphanumeric string or metadata that may be associated with a cryptographic token. In a footwear context, for example, each unique crypto token may be linked to a single digital CryptoKick asset, which may be embodied as a virtual reproduction or digital-art version of a sneaker. In some embodiments, for example, this token may include an n-bit (e.g., a 32-bit or a 64-bit or a 128-bit) alphanumeric code that is sectioned into individual code segments or otherwise encrypts a plurality of code segments. One or more or all of these code segments of the alphanumeric code may express data indicative of attributes of the collectible digital shoe. For instance, a series of code segments may provide digital shoe attributes, such as Style, Materials, Family, Heat, Colorway, Future Attributes, Make, Model, Pattern Scheme, Image Background, etc. Select segments of a code may function as an encoded design composition that produces a visual expression to a user. In some embodiments, these digital shoe attributes may be stored in metadata on the cryptographic record or in an accessible datafile that is referenced by the cryptographic record. In some embodiments, the originally created CryptoKick may include metadata within the cryptographic record that is representative of attributes from a companion physical shoe. During the creation of a CryptoKick, a smart contract may be generated to certify authenticity and ownership as well as to track future transaction of the digital or physical asset.

In some implementations, a user's cryptographic digital asset may be capable of being exported from a host platform to an NFT-enabled "custodial" crypto wallet and, when desired, exported from the crypto wallet to one or more third-party digital platforms or another user's custodial wallet. For instance, a CryptoKick may be converted into a downloadable graphic "skin" that may be imported into an online VG platform and "worn" by a video game character that may be developed and/or controlled by the user. If a user is active in a certain basketball video game, for example, a CryptoKick may be imported into that game and worn by the user's player or team. When a CryptoKick is imported into a video game, different attributes of the CryptoKick may impart changes in the ability/level of a user's character outfitted with the asset. In one example, the attributes of the user's character may be positively (or negatively) influenced by the rarity (or abundance), the exclusivity (or commonness), a name brand (or generic) make/model, and/or the distinct attributes of an imported digital asset. For example, a rare CryptoKick may impart better jumping ability or lateral quickness, a rare CryptoThread may impart better strength or speed, and a rare CryptoLid may impart better vision.

Referring now to the drawings, wherein like reference numbers refer to like features throughout the several views, there is shown in FIG. 1 a representative article of footwear, which is designated generally at 10 and portrayed herein for purposes of discussion as an athletic shoe or "sneaker." The illustrated article of footwear 10—also referred to herein as "footwear" or "shoe" for brevity—is merely an exemplary application with which novel aspects and features of this disclosure may be practiced. In an example, the illustrated article of footwear 10 may be linked to or resemble a digital image created for a CryptoKick. In the same vein, implementation of the present concepts for a digital shoe and a cryptographic token for footwear should also be appreciated as representative implementations of the disclosed concepts. It will therefore be understood that aspects of this disclosure may be utilized for any logically relevant consumer product or tangible good, may be backed by an assortment of decentralized blockchain ledgers, and may be implemented by various distributed computing networks. As used herein, the terms "shoe" and "footwear," including permutations thereof, may be used interchangeably and synonymously to reference any suitable type of garment worn on a human foot. Lastly, features presented in the drawings are not necessarily to scale and are provided purely for instructional purposes. Thus, the specific and relative dimensions shown in the drawings are not to be construed as limiting.

As a general matter, each element, panel, section, material, and physical attribute of the article of footwear 10 shown in FIG. 1 may be separately rendered or defined in a digital CryptoKick. For instance, a high-resolution digital image (e.g., 300+DPI), an artistic digital rendering, or a three-dimensional (3D) image file may be derived from the footwear 10 and memory-stored in a suitable image file format (e.g., JPEG XL, Vector, etc.). These visual creations may be referenced to in metadata via a pointer to a file location. Furthermore, these attributes may similarly be reflected within the metadata of a corresponding NFT that has been minted and assigned to the digital asset corresponding to the footwear 10 of FIG. 1.

Figure 2:
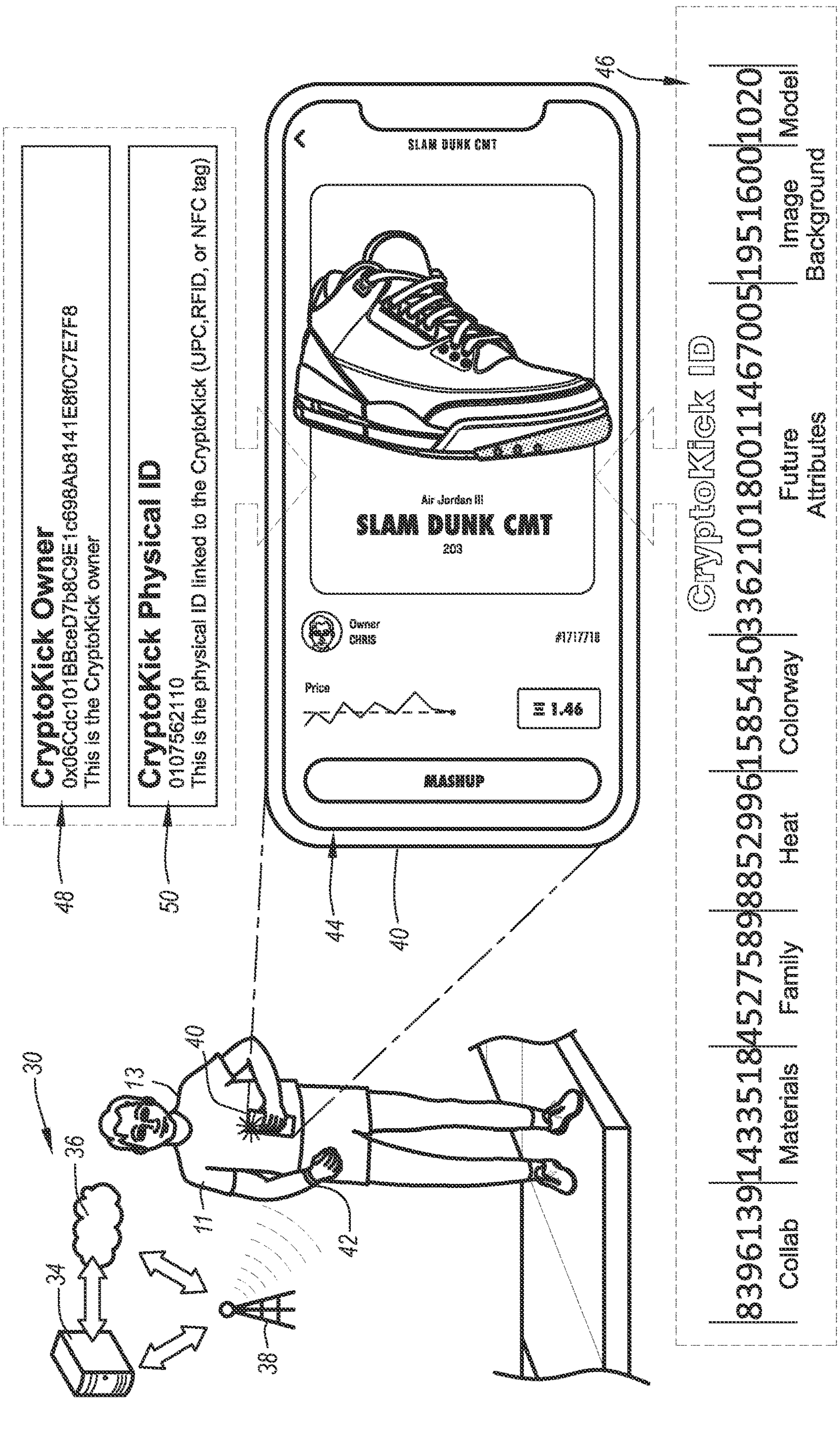
FIG. 2 is a diagrammatic illustration of a representative distributed computing system for accessing, securely storing, and transferring digital assets across heterogeneous digital platforms in accordance with aspects of the present disclosure.

FIG. 2 is a diagrammatic illustration of an exemplary distributed computing network, designated generally as 30, with attendant control logic for accessing, securely storing, and transferring blockchain-enabled digital assets. User 11 is shown communicatively connecting to a remote host system 34 (e.g., NIKE®.SWOOSH® platform) and/or a cloud computing system 36 (e.g., NFT-enabled digital wallet platform or Web 2.5 asset-exchange arbitration platform) via a wireless communications network 38. While illustrating a single user 11 communicating over the distributed computing network 30 with a single host system 34 and a single cloud computing system 36, it is envisioned that any number of users may communicate with any number of remote computing nodes that are suitably equipped for exchanging information and data across a distributed network. Wireless data exchanges between the user 11 and remote computing nodes on the distributed computing network 30 may be conducted directly, e.g., through direct communications between the host system 34/cloud computing system 36 and a user device 39 (e.g., the user's smartphone 40, smartwatch 42, or other suitable personal computing device), or indirectly, e.g., with all communications between the user 11 and other computing nodes being routed through the host system 34.

Figure 3:
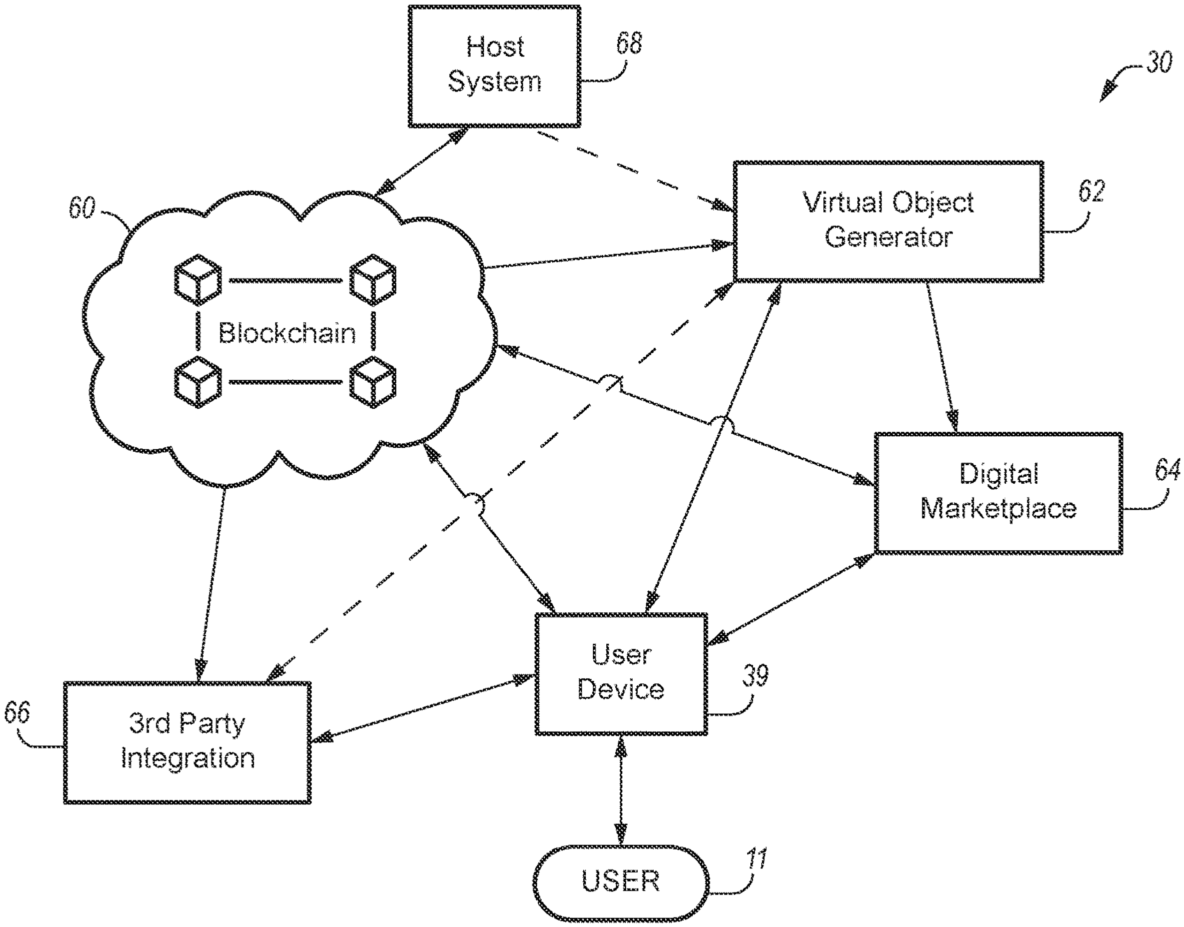
FIG. 3 is a diagrammatic illustration of a representative decentralized computing system architecture for generating, securing, and exchanging cryptographic digital assets in accordance with aspects of the present disclosure.

Only select components of the distributed computing network 30 of FIG. 2 and the decentralized computing system 30' of FIG. 3 are shown and will herein be described in further detail. Nevertheless, the networks, systems, and devices discussed herein can include numerous additional and alternative features, and other available hardware and peripheral components, for example, for carrying out the various methods and functions disclosed herein. While the described system relies on a blockchain ledger and process for recording ownership of the digital asset, for example, it should be understood that the present technology may operate on a public chain or a private chain, and may utilize one or more forms of cryptography, encoding, proof of work challenges, or other concepts and technologies involved in available blockchain standards or suitable alternative immutable databases/ledgers.

With continuing reference to FIG. 2, the host system 34 may be implemented as a high-speed server-class computer or a mainframe computing device capable of handling bulk data processing, resource planning, and transaction processing. For instance, the host system 34 may operate as middleware in a client-server interface for conducting any necessary data exchanges and communications with one or more "third-party" servers to complete a particular transaction. The cloud computing system 36, on the other hand, may operate as middleware for IoT (Internet of Things), WoT (Web of Things), Internet of Adaptive Apparel and Footwear (IoAAF), and/or M2M (machine-to-machine) services, connecting an assortment of heterogeneous electronic devices with a service-oriented architecture (SOA) via a data network. As an example, cloud computing system 36 may be implemented as a middleware node to provide different functions for dynamically onboarding heterogeneous devices, multiplexing data from each of these devices, and routing the data through reconfigurable processing logic for processing and transmission to one or more destination applications. Network 38 may be any available type of network, including a combination of public distributed computing networks (e.g., Internet) and secured private networks (e.g., local area network, wide area network, virtual private network). It may also include wireless and wireline transmission systems (e.g., satellite, cellular network, terrestrial networks, etc.). Most if not all data transaction functions carried out by the user 11 may be conducted, for example, over a wireless network, such as a wireless local area network (WLAN) or cellular data network.

As a decentralized blockchain platform, computing system 30' operates as an open, yet encrypted peer-to-peer network in which asset transaction records—known as "blocks"—are linked via cryptographic hash functions in a distributed, immutable ledger of interconnected blocks, i.e., a "blockchain." Each block in the chain includes one or more digital asset transactions accompanied by corroboration information representing a validity of each transaction as assessed by peer-validation devices. Encrypted, decentralized computing architectures allow for identity verification and authentication of transacted assets while preventing duplication of a cryptography-protected ("cryptographic")

digital asset registered to the platform. Decentralized asset management may work by encrypting a proprietary asset file, breaking the encrypted code into tiny "nonsense" shards, and sending these code shards to numerous different computing nodes on the decentralized computing network. A validated owner is provided with a private key that indicates where in the network the asset is located and how to reassemble or "decrypt" the file. For use as a distributed ledger, an individual blockchain is typically managed by a host administrator and distributed to multiple peers collectively adhering to a protocol for inter-node communication and block validation.

One should appreciate that disclosed systems and techniques provide many advantageous technical effects including construction and storage of a digital asset blockchain representing user-to-user transactions of virtual collectibles and other digital assets. Further, blockchain technology enables the creation of unique, yet fully transferrable digital assets that maintain value by way of the general inability to make lossless copies (unlike traditional, unsecured digital files). Additional advantageous technical effects may include secure network architectures and control logic for importing and exporting digital assets across heterogeneous digital platforms in which platform-to-platform security, accessibility, and interoperability may be asynchronous and incompatible. As a further example, disclosed systems and methods allow a host digital platform to provision digital assets and selectively tokenize those assets without ever taking custodial possession of the resultant non-fungible assets. Rather, the host platform may, in predesignated instances, operate solely as a middleware computing node and isolate itself from possessing or managing the NFT and/or its attendant private key.

FIG. 3 provides an example of a functional structure of a decentralized computing system 30', which may be accessed by a user 11 via a distributed computing network 30 as shown in FIG. 2. As generally illustrated, a user 11 may operatively interface with a user device 39 (human-machine interface (HMI)) that may include one or more of a wireless-enabled smartphone 40, a tablet computer, a smart watch 42, a laptop computer, a desktop computer, a standalone video game console, smart footwear/apparel, or other internet-enabled computing device. The user device 39 is shown wirelessly communicating with multiple remote computing nodes, including an immutable public database, which is represented in FIG. 3 by a blockchain service 60 (e.g., Ethereum, Solana, Tezos, etc.), as well as a virtual object generator 62, an online digital marketplace 64, a third-party integration engine 66 and/or middleware and backend service providers.

Blockchain service 60 of FIG. 3 maintains a cryptographic distributed ledger with an ever-growing list of record blocks, at least some of which have registered thereon one or more non-fungible tokens that each contains description and identification information representative of a digital asset. The user 11 may employ the user device 39 to setup and access a digital blockchain locker or an NFT-enabled crypto wallet that securely stores a private cryptographic key that permits the user device to retrieve, read, and/or manipulate the encrypted data associated with the token. This private key, for example, may enable the user 11 to freely transfer ownership of the non-fungible token and any digital asset associated therewith. It should be understood that not all digital wallets support blockchain-backed objects, and not all crypto wallets support NFTs. In the same vein, not all distributed ledgers support blockchain-backed objects, and not all blockchains and blockchain service providers support NFTs.

With continuing reference to FIG. 3, a virtual object generator 62 may be accessed to create a digital asset (referred to interchangeably as "digital object") on the basis of the information provided by a host system 68, a user 11, a collaborator, an artist or designer, etc. The virtual object generator 62 may be responsible for expressing underlying object code (e.g., genomic information) into observable characteristics (e.g., phenotypic traits). The virtual object generator 62 may employ sets of stylistic and artistic rules such that the resultant digital objects are unique yet recognizable according to predefined silhouettes, styles, articles, characters, etc. A virtual object generator 62 may optionally generate digital assets on the basis of other factors, such as the age of the asset, user activity (e.g., tracked via the user device 39), or use of the asset via third-party individuals and/or platforms. In such an instance, these inputs may alter the visual, audible, and/or contextual expression of the digital asset, may unlock new abilities associated with the asset, may enable additional import/export/trading rights for the asset, activate physical production rights, etc. By way of non-limiting example, a color or color scheme of a CryptoKick may depend on a "genetically assigned" color, together with the age of the asset and/or use of the asset in a virtual world or via a linked pair of physical shoes in the real world. The initial color together with the age/experience-based alteration may result in a new color that has its own relative rarity score/value.

In accord with the illustrated example, the blockchain service 60 and the virtual object generator 62 are in communication with a hosted platform, digital market, vendor, forum, social platform, or the like (collectively designated as "digital marketplace 64"). The digital marketplace 64 may represent a variety of different digital assets in such a manner that permits the organized trade, transfer, or sale/purchase of these assets between parties. Upon the closing of a sale, for example, the digital marketplace 64 may update the blockchain 60 with the new ownership information and facilitate the transfer of new or existing keys to the new asset holder. A marketplace 64 may further enable various social engagement functions, such as voting or commenting on the represented virtual objects. Likewise, in some instances the marketplace 64 may assess and score the rarity of a particular virtual object based on the sum total of the object's expressed traits. Such a rarity score may then enable the marketplace and/or users who participate within the marketplace to better assess the value of the object.

Decentralized computing system 30' of FIG. 3 may include a third-party integration engine 66 that may enable the use of a digital asset in different contexts or different manners or different platforms. This third-party integration engine 66 may operate as an Application Programming Interface (API) on a dedicated mobile app provided on the user's device 39 or as a dedicated cloud-based middleware service. The third-party integration engine 66 may optionally make a digital asset (for example, as expressed by the virtual object generator 62) and/or the underlying asset code available for external use (e.g., for import to and use within an augmented reality (AR), virtual reality (VR), or video game (VG) platform). Examples of such a use may include a digital gaming "skin" worn by a third-party video game character, a digital game asset capable of being used by a third-party video game character, digital footwear/apparel superposed or superimposed within an AR or VR environment, digital artwork displays, physical print generation, manufacturing production, and the like.

As further shown in FIG. 3, a corporate host system 68 may be in communication with the user device 39, blockchain service 60, virtual object generator 62, and digital marketplace 64 creating new digital assets, offering preexisting digital assets, and/or directly or indirectly provisioning blockchain-secured digital assets. Additionally, the host system 68 may provide one or more rules to the virtual object generator 62 to constrain the manner and style in which underlying asset code and attendant information from the blockchain 60 is expressed in a visual/artistic form. Host system 68 may facilitate the export of digital assets to third-party platforms, either directly or through the third-party integration engine 66, through an NFT-enabled crypto wallet service, and/or through an intermediary arbitrator platform.

A user may create, retrieve, access, or receive (collectively "obtain") a fungible digital asset in the form of a non-NFT virtual good (VGOOD), e.g., through a registered personal account on the host system 68. If the user then wishes to export the VGOOD to a third-party virtual platform or to leave the host platform from which the VGOOD is obtained, the host platform may automatically mint a non-fungible token for the VGOOD and, if desired, the user may be prompted to approve the minting. The newly minted NFT may be placed into a self-sovereign wallet or a custodial wallet for subsequent transfer to any of a myriad of third-party platforms. If the user wishes to return to the host platform and/or import the VGOOD back to the host platform, the user may be required to burn the NFT or turn over the NFT to the host platform for disposal. With this arrangement, the host platform does not have to offer custodial services or crypto wallet services for storing minted NFTs. It may be desirable that the host system 68 not take custody or possession of the NFT; a user 11, therefore, is not required to mint a digital asset to make use of existing services on the host system 68 platform.

Discussed below are distributed computing networks with decentralized computing systems, including attendant control logic and memory-stored CRM, for provisioning a single-password service for users of a host platform to acquire (and utilize) an NFT-compatible custodial wallet while keeping the host platform at arm's length by the host platform not having direct access, visibility to, or any flow of the password, the private key(s), full seed-phrase, or direct participation in the custodial wallet services provided to the user. In this example, the host platform does not hold the private keys to the user's custodial wallet; rather, the host platform (through the browser) facilitates sourcing the custodial services to a third-party wallet vendor (e.g., the browser interacting with the host platform user acts as intermediary agent between user and their wallet). The host platform may enable host platform users to acquire digital assets, mint NFTs for the digital asset, transfer these crypto-backed digital assets to discrete custodial wallets maintained by third-party wallet service platforms, and have a single wallet password (versus a full-seed phrase (e.g., private key)) to access the custodial wallet.

To enable a single-password service for third-party custodial wallets, a Multiparty Computation (MPC) protocol may segment a wallet's private key into encrypted shares and divide the resultant shares amongst multiple trusted "sanctioning" parties. When the password is needed, for example, to sign a message verifying you have token access or authorize transferring an NFT to another wallet, MPC is set in motion to confirm that all trusted parties, or a predetermined number of parties out of the full set, sanction the request (e.g., a minimum of three out of four required to approve request). In this example, the host platform may securely retain one or more private key shares so long as the host does not have possession of all shares at one point in time. It may be desired that the MPC protocol employ a multilayer decentralized dMPC blockchain and wallet service, in which a private key is never generated for the user's custodial wallet; rather, each wallet is assigned a set of designated approvers where a predefined number of approvers need to sign a transaction before it's submitted to the blockchain. The MPC may optionally employ a Threshold Signature Scheme (TSS) wallet service in which the wallet's private key is split into user, platform, and backup key segments and divided between multiple parties. The TSS protocol generates a single digital signature from multiple independent signatories for an MPC wallet. The host platform may retain only the backup key segment to provide a user with secondary verification.

When conducting initial (primary) and future (secondary) transactions, the host platform may absorb any transaction costs (e.g., "gas fees") so the host platform user is not required to navigate such processes. To execute a transaction, a user may be required to enter a secure wallet password to call the private key/key segments. The host platform may be operatively blinded to and prevented from holding a user's password and full private key; all key segments—user, public, backup, etc. —may be retained by and transacted with the third-party custodial wallet platform. However, since the user's private key and key segments are encrypted, the custodial wallet platform does not have direct access to the entire key and/or all key segments (may have access to public key and/or backup key segment).

For a custodial wallet holder to execute a transfer function (e.g., transfer NFT out of wallet), the host system may implement a smart contract that automates payment for the gas fees (e.g., POLYGON® cryptocurrency) from an account separate from the user's custodial wallet to record the transaction on the blockchain ledger (e.g., POLYGON® blockchain) from the custodial wallet. Operating on a user's personal computing device is a browser web page or dedicated software application (both of which are inaccessible/separate from the host platform and it's view or control) that may temporarily hold the user's encrypted private key for a finite moment in time; the user inputs a password/phrase to "approve transaction". In doing so, an encrypted message to approve the transfer is sent from the user's device to the host system server; the server solicits the public key from the user's wallet to decrypt this message and initiate the requested transfer at the contract level.

After the encrypted private key is used to complete the transfer, it is effectively removed from the user's device (i.e., deleted from device memory/browser). With this approach, the third-party custodial wallet platform may operate within a consumer environment, where a consumer calls their wallet to complete a transfer function, while operating with/in a front-end market platform and protecting a host-party platform from ever creating, accessing, or retaining the consumer's private key (operating Host Protocol Services, an "End to End Encrypted (E3) Wallet Protocol").

Figure 4:
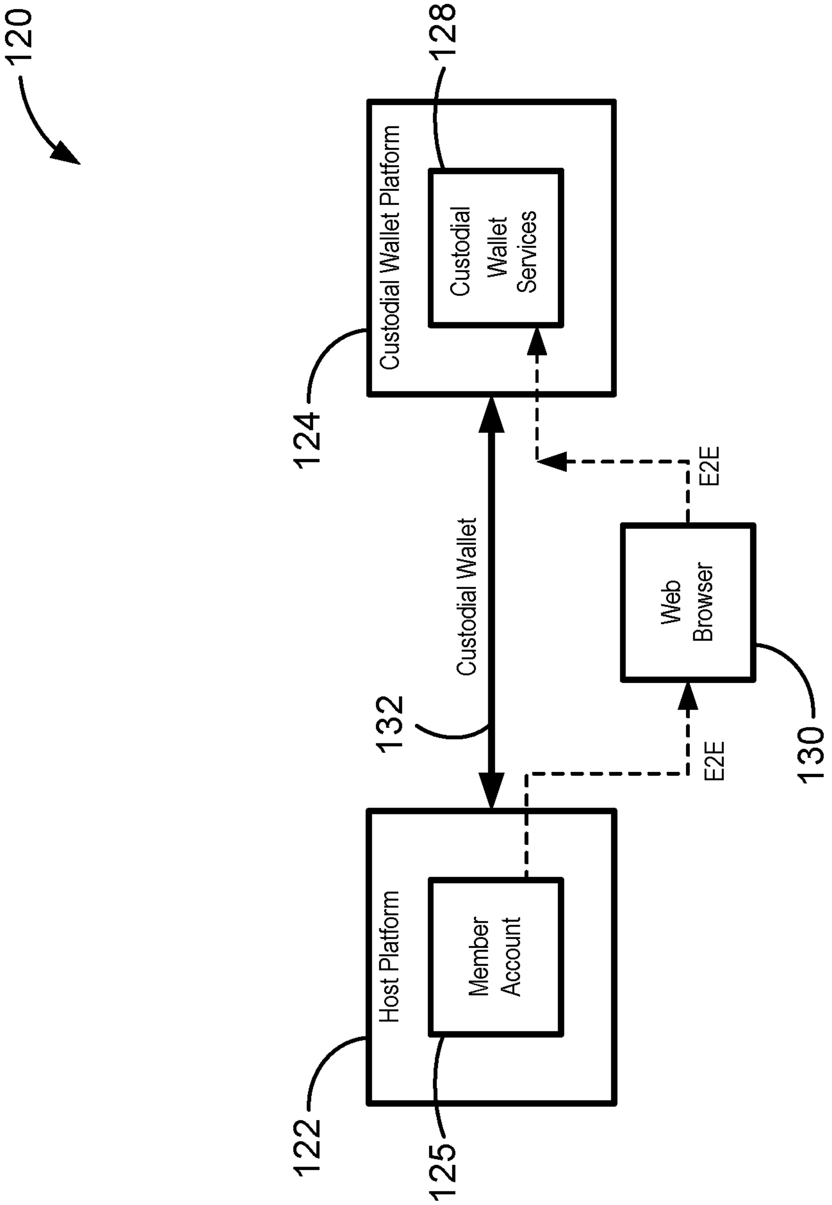
FIG. 4 is a diagrammatic illustration of a representative host platform partnering with a representative custodial wallet platform to create and manage on the custodial wallet platform a custodial wallet for a user of the host platform in accordance with aspects of the present disclosure.

With the foregoing in mind, FIG. 4 illustrates a representative computing system 120 for providing consumer interactions with custodial digital wallet services for blockchain-enabled digital assets. In FIG. 4, a host platform 122 partners with a custodial wallet platform 124 to create and manage, on the custodial wallet platform 124, a custodial wallet 128 for a user of the host platform 122. This custodial wallet 128, which resides on and is provisioned by the custodial wallet platform 124, may be linked to a member account 126, which resides on and is provisioned by the host platform 122. A set of custodial wallet services 132 is supported by the custodial wallet platform 124 to facilitate the exchange of one or more digital assets that are transacted, for example, in communication with one or more of the host-platform member account 126, the host platform 122, smart contracts, and the blockchain. The user may employ a web browser 130 to access the member account 126 on the host platform 122 and the custodial wallet 128 on the custodial wallet platform 124. The user may enter a simple wallet password via the web browser 130 to execute an End to End Encrypted (E3) wallet protocol and thereby access the custodial wallet 128.

The host platform 122 enables a user on the host platform 122 to interact with their third-party custodial wallet 128, e.g., using a single, user-selected "simple" password instead of a full-seed phrase and without needing to download/install a browser extension (e.g., this "solve" may be built through browser web-services). Without implementing a browser extension, the user's web browser 130 accesses a webpage service that holds the user's encrypted private key for a moment in time. To approve a transaction of a blockchain-enabled digital asset, the user submits their password to the third party custodial wallet platform 124; upon doing so, an encrypted message is sent from the custodial wallet platform 124 to the host platform 122 to "OK" or otherwise approve of the requested asset transfer. The host platform 122 then transmits a request to the custodial wallet platform 124 for the public key to decrypt the encrypted message and, after decryption, the smart contract for the blockchain-enabled digital asset makes the transfer at the contract level. While not per se required, the host platform 122 may pay any attendant transfer (gas) fees for completing the requested asset transfer. Once the encrypted private key is used to complete the asset transfer, the private key will effectively be removed from resident memory of the user's computing device and concomitantly deleted from the user's web browser 130. This allows for a functional framework with a consumer environment in which a consumer is able to "call" their wallet (e.g., to execute a transfer function) while operating within a host-party's environment (e.g., NIKE.Swoosh platform) to protect the host party company (e.g., NIKE) from ever seeing/touching/accessing the consumer's private key.

While not per se limited, the host platform 122 may be a company, a brand, a verified vendor or representative of the company/brand, a subsidiary, franchise, or affiliate of the company/brand, etc. The custodial wallet platform 124, on the other hand, is a third-party vendor that is owned/operated by an entity other than the host platform 122 and provides custodial wallets (e.g., end-user crypto wallet such as custodial wallet 128) with related custodial wallet services 132. These custodial wallet services 132 may include the provisions and protocols that detail how the third-party custodial wallet provider links their custodial wallet platform 124 with the host platform 122 and gives users access to see/use their custodial wallets 128 (e.g., "their integration work"). Any attendant wallet platform technology includes the tech behind the custodial wallet platform 124, including the manner in which the custodial wallets 128 are created and managed and the manner in which custodial wallet services 132 are delineated and provided. As used herein, the term "custodial platform wallet package" may be used to collectively reference a custodial wallet platform and its technology (such as custodial wallet platform 124,) a custodial wallet and its technology (such as custodial wallet 128), and custodial wallet services and its technology (such as custodial wallet services 132.) As used herein, the term "host platform package" may be used to collectively reference a host platform (such as host platform 122) that includes member accounts 125, and host protocol services such as an End to End Encrypted (E3) wallet protocol service that enables a user of the host platform to securely interact with their custodial wallet (that is part of a custodial platform wallet package) through a web browser based interaction on the user's device, separated from the host platform.

As explained above, the custodial wallet platform 124 enables custodial wallet services 132 that allow end users to connect with the custodial wallet platform 124 when logged into the host platform 122 (e.g., via member account 126). In addition to base wallet services, the custodial wallet services 132 may include wallet view services and called wallet NFT transfer services. These features may only be accessible when the end user inputs their wallet password and directs the custodial wallet platform 124 to transact with the end user's custodial wallet 128. It is this call service for NFT transfer services (e.g., utilizing custodial wallet services 132) that functions with the additional E3 protocol service enabled through a user's web browser 130 that distances the host platform 122 from the custodial wallet platform 124 and any direct access to, control over, or custodial rights of the user's custodial wallet 128. In this way, the end user controls the custodial wallet 128 within the confines of custodial wallet platform 124 custody completely separated from the host platform 122 and member account 125 . . . . Host Protocol Services—the End-to-End Encryption (E3) Protocol—provides the framework for how a user can call their custodial wallet to complete an asset transaction with a smart contract on the blockchain when interacting with custodial wallet services 132, the host platform 122, custodial wallet platform 124, and their custodial wallet 128.

With reference now to the flow charts of FIGS. 5-9, there are presented improved methods/control strategies 100, 200, 300, 400, and 500, respectively, for providing consumer interactions with custodial digital wallet services for blockchain-enabled digital assets. Said another way, while FIG. 4 generally illustrates the host platform package and/or host protocol services framework, FIGS. 5-9 schematically illustrate different use cases whereby the E2E protocol is used within a web-browser to seamlessly link the user with the custodial wallet package and perform different actions. Some or all of the operations illustrated in FIGS. 5-9 and described in further detail below may be representative of an algorithm or algorithms that correspond(s) to processor-executable instructions that may be stored, for example, in main or auxiliary or remote memory, and executed, for example, by a resident or remote controller, central processing unit (CPU), control logic circuit, or other module or device or network of devices, to perform any or all of the above or below described functions associated with the disclosed concepts. It should be recognized that the order of execution of the illustrated operation blocks may be changed, additional operation blocks may be added, and some of the blocks described may be modified, combined, or eliminated. While presented as separate control algorithms, it is envisioned that any of the process blocks, options, and features described below with respect to the method 100 of FIG. 5 may be incorporated, singly or in any combination, into the methods 200, 300, 400, and/or 500 of FIGS. 6-9, and vice versa.

Figure 5:
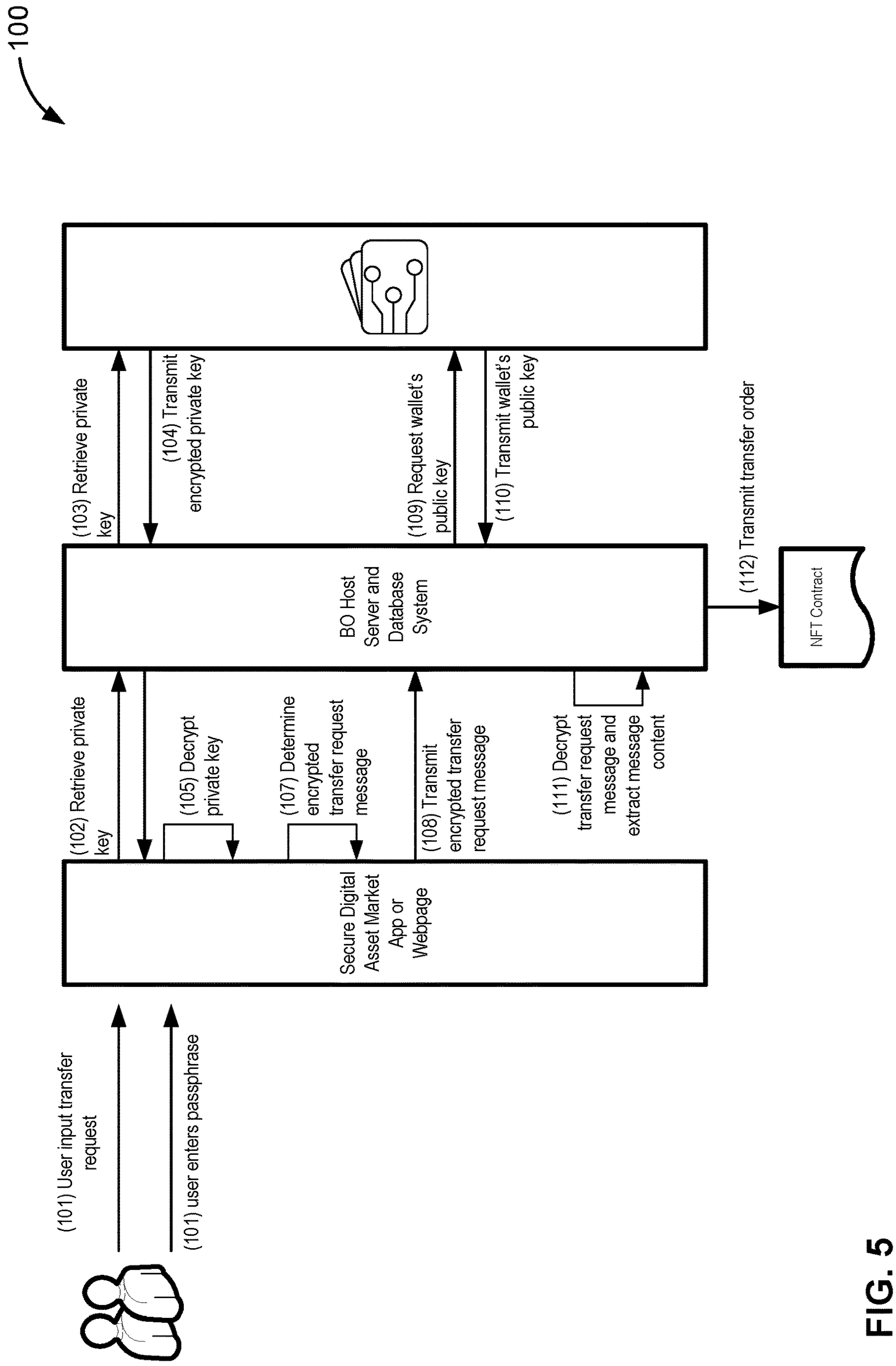
FIG. 5 is a flowchart illustrating a representative algorithm for providing consumer interaction with custodial digital wallets services provided by a third-party platform for blockchain enabled digital assets through a browser or app in communication with a host platform, which may correspond to memory-stored instructions executed by programmable electronic control unit, logic circuitry, or other computer-based device or network of devices in accord with aspects of the disclosed concepts.

FIG. 5 is a flowchart illustrating a representative algorithm/method 100 for facilitating a user-initiated transfer of an cryptographic digital asset provided in a custodial wallet. The method 100 of FIG. 5 may be initiated upon receipt of a transfer request input by a user to transfer the cryptographic digital asset from a custodial wallet provisioned by a third-party wallet platform, as indicated at first process block (101). In accord with the example of FIG. 2, the user 11 may access the SDAM webpage/app using their smartphone 40 and, through the SDAM, transmit a transfer request over the distributed computing network 30 to the host system 34 server. Upon receipt of the transfer request, the method 100 may execute second process block (102) and automate a request to retrieve the user's encrypted private key for the custodial wallet containing the digital asset being transferred. In accord with the illustrated example, the SDAM webpage/app transmits a preliminary request for the private key to the BO host system at process block (102); the BO host system responsively transmits a formal request for the private key to the custodial wallet platform at third process block (103). The custodial wallet platform may confirm the validity of the user's security credentials embedded within the formal request and, if the credentials are valid, responsively execute fourth process block (104) to transmit the requested private key to the SDAM webpage/app, either directly or through the BO host system as a secure intermediary.

After receiving the encrypted private key, method 100 of FIG. 5 executes fifth process block (105) and decrypts the received private key. Using a decryption key passphrase input by the user at sixth process block (106), for example, the SDAM webpage/app decrypts the encrypted private key. For instance, an encryption key may be derived from the user-supplied passphrase and a set of attendant key derivation function (KDF) parameters; the encryption key and a cryptographic block cypher or hash function algorithm may then be used to decode and decrypt the encrypted private key. In at least some applications, the private key is initially encrypted using a secure multi-party computation cryptographic protocol to parse the private key into several encrypted key shares, each of which is distributed to a respective party within a constrained set of parties. The encrypted private key may be decrypted by executing a secret sharing function of the MPC during which some, but not all, of the encrypted key shares are shared amongst the respective parties within the constrained set of parties and at least a predefined minimum number of the respective parties with the encrypted key shares approves the decryption. It may be desirable that the secure MPC cryptographic protocol include a multilayer decentralized MPC protocol with a Layer 2 blockchain on which is recorded possession information, transaction records, and/or governance approvals of the encrypted key shares of the parsed encrypted private key. Additionally, the MPC protocol may employ a Threshold Signature Scheme protocol to generate a single digital signature from respective signature segments provided by the parties holding the encrypted key shares.

After decrypting the user's private key at process block (105), method 100 executes the memory-stored programmable instructions of seventh process block (107) and automates the creation of an encrypted transfer request message using the decrypted private key. In the illustrated example, the SDAM webpage/app generates a verified transfer request to transfer the cryptographic digital asset from the user's custodial wallet to a new digital wallet (e.g., TRANSFER NFT XYZ FROM CUSTODIAL WALLET TO THIRD-PARTY USER'S WALLET). Using the decrypted private key, the SDAM encrypts the verified transfer request to derive the encrypted transfer request. Once created, the method 100 transmits the encrypted transfer request at eighth process block (108) of FIG. 5. As shown, the encrypted transfer request is transmitted from the SDAM webpage/app on the user's personal computing device to the BO host system server.

With continuing reference to FIG. 5, method 100 may respond to receipt of the encrypted transfer request at process block (108) by executing ninth and tenth process blocks (109) and (110) to request and receive, respectively, an unencrypted public key that corresponds to the user's private key and enables transfers to/from the user's custodial wallet. According to the illustrated example, the BO host system solicits the Custodial Wallet Platform for the transfer-requesting user's public key. Since the public key is typically unencrypted and unsecured, the public key can be openly distributed without compromising the wallet's security; the custodial wallet platform transmits the custodial wallet's public key to the BO host system. By way of clarification, and not limitation, a wallet's public key may be deemed similar to a wallet account number that can be shared with anyone. In contrast, a wallet's private key is typically kept secret and secured unless/until the user desires to send or withdraw from the contents of their digital wallet. On the other hand, a wallet's seed phrase is typically used to secure the wallet account and restore the wallet, e.g., in situations in which a user inadvertently loses or uninstalls the wallet.

Upon receipt of the custodial wallet's public key at process block (110), method 100 executes the subroutine instructions of eleventh process block (111) to decrypt the encrypted transfer request message and extract select message content from the decrypted message. The BO host system server may use the custodial wallet's unencrypted public key to decrypt the encrypted transfer request message (e.g., using a mathematical public key encryption algorithm) and, once decrypted, retrieve select message content from within the transfer request. Using the unencrypted public key and retrieved message content, the method 100 of FIG. 5 then generates a transfer order to transfer the cryptographic digital asset from the custodial wallet to the new digital wallet at twelfth process block (112). For instance, the host server may generate an NFT smart contract with stipulations for transferring a select NFT, and transmit the transfer order to the third-party server to execute the requested transfer.

Figure 6:
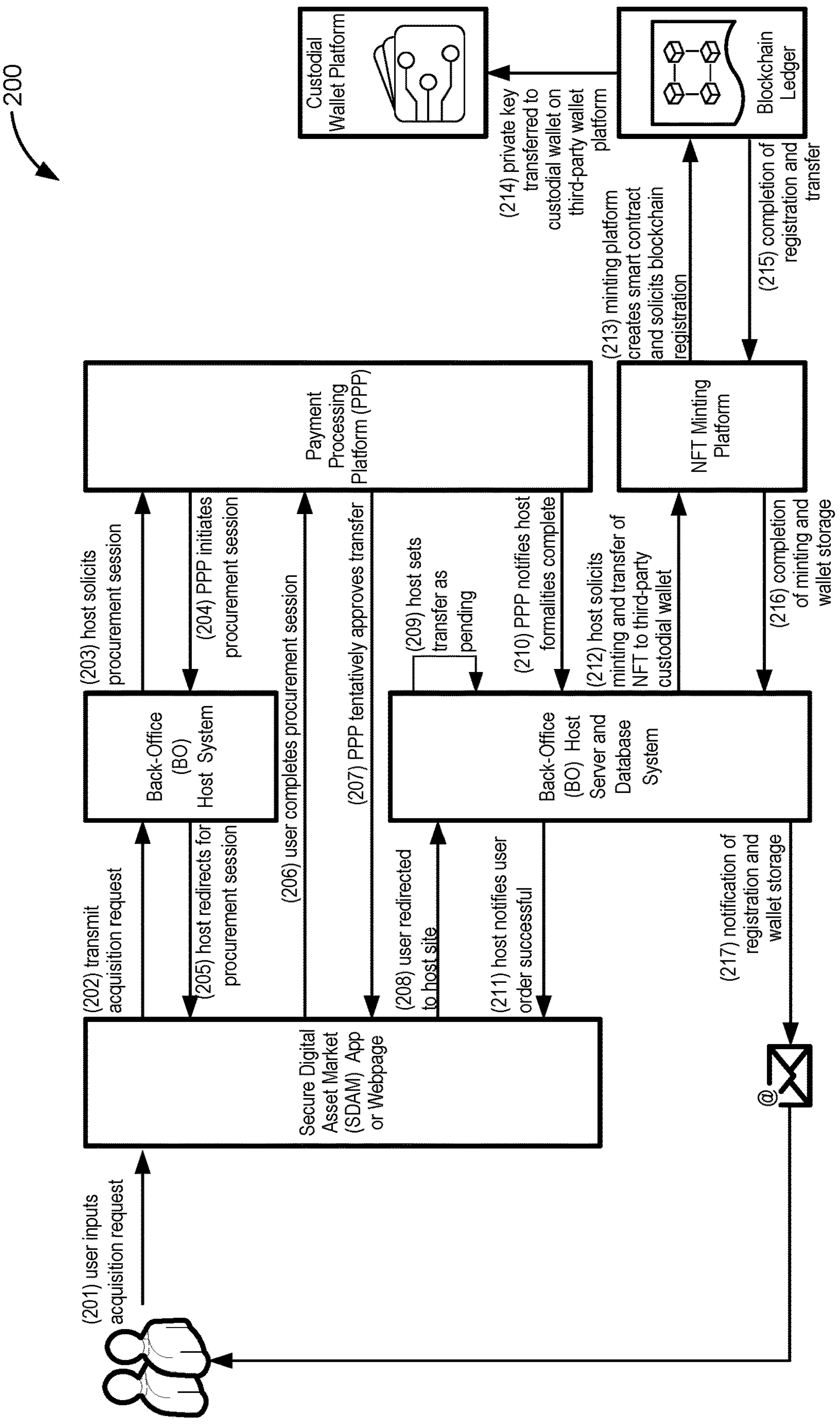
FIG. 6 is a flowchart illustrating a representative algorithm for a primary sale of a cryptographic digital asset on a primary digital marketplace website and secure storage of the digital asset in a custodial wallet hosted by a third-party platform, which may correspond to memory-stored instructions executed by a programmable electronic control unit, logic circuitry, or other computer-based device or network of devices in accord with aspects of the disclosed concepts.

While FIG. 5 illustrates a method 100 for transferring a cryptographic digital asset using the E2E protocol of FIG. 4, FIG. 6 schematically illustrates a method 200 for a primary sale of a cryptographic digital asset on a primary digital marketplace website and secure storage of the digital asset in a custodial wallet hosted by a third-party platform. The method 200 of FIG. 6 begins at first process block (201) with processor-executable instructions for a programmable controller or control module or similarly suitable processor to call up an initialization procedure for a protocol to acquire a digital asset, such as computer-generated digital shoe 44 of FIG. 2, that is later assigned a blockchain-secured encrypted token, such as NFT key 46 of FIG. 2, for a consumer product, such as sneaker 10 of FIG. 1. This routine may be called-up and executed in real-time, continuously, systematically, sporadically, and/or at regular intervals. In some digital-twin embodiments, the initialization procedure at process block (201) may automatically commence each time a pair of authentic footwear 10 is manufactured, each time a user 11 purchases a real-world pair of the footwear 10, or each time a user 11 unlocks an access key 46. Alternatively, the initialization procedure may be manually activated by an employee at a POS terminal, by a manufacturer through a dedicated mobile app, or by a user or designer creating a digital asset. Upon completion of some or all of the control operations presented in FIG. 6, method 200 may advance to an END terminal block and temporarily terminate or, optionally, may loop back and run in a continuous loop.

Utilizing a portable electronic device 39, such as smartphone 40 or smartwatch 42 of FIG. 2, the user 11 may launch a dedicated mobile software application ("app"), such as NIKE® SNKRS® app, or a web-based applet, such as NIKE+®, that collaborates with a server-class (backend or middleware) computer (e.g., remote host system 34, 68) to communicate across distributed computing network 30 with various peer devices on decentralized computing system 30'. During a communication session with the host system 34, 68, for example, the user 11 may purchase a pair of the footwear 10 of FIG. 1 or the NFT-secured digital shoe 44 of FIG. 2 using a corresponding feature provisioned by the app. The user 11 enters personal information and, if required, a method of payment to complete the transaction. Upon completion of a validated payment, the host system 34 receives, e.g., from an online store transaction module or an approved third-party electronic payment system, a transaction confirmation to indicate a validated transfer of the physical footwear 10 and/or digital shoe 44 to the user 11 has been completed. As indicated above, a validated transfer of the physical footwear 10 and/or digital shoe 44 may be effectuated through any available means, including at a brick-and-mortar store, through an online auction website, an aftermarket consumer-to-consumer trade/sale, etc. In still further embodiments, the initialization procedure may begin when the host system receives a request from the user that expresses an intent to acquire a newly minted cryptographic digital asset.

After the user inputs an acquisition request (e.g., BUY NOW) to a Digital Asset Market (SDAM) webpage or app (e.g., NIKE® Swoosh.com) at process block (201), the SDAM webpage/app generates and transmits a preliminary request to acquire a digital asset to a back-office (BO) host service system (e.g., NIKE® virtual private server (VPS)) at second process block (202). At this juncture, the BO host server may receive, process, and store in an associated database the asset requisition. Upon clearing of any preliminary evaluations (e.g., verify asset available; verify user authorized for personal account with host system), the host solicits a procurement session with a third-party Payment Processing Platform (PPP) at third process block (203). For instance, the host VPS may initialize a "buying session" with a global payment API (e.g., STRIPE®) through an automated device-to-device handshake; upon acceptance of the handshake, the payment API initiates the requested procurement session at fourth process block (204).

To complete the procurement session, a procurement session portal (e.g., payment checkout) URL or hyperlink may be sent directly to the user's personal computing device or may be routed to the user through the BO host server at fifth process block (205). Method 200 thereafter advances to sixth process block (206), at which the user completes the procurement session (e.g., by creating a personal account, entering personal identification information, submitting a valid form of payment, completing checkout procedures, etc.). Upon completion of the procurement session, the PPP transmits a confirmation and tentative approval of the user's acquisition request to the user's device via the SDAM webpage/app at seventh process block (207). It is envisioned that "procurement" of a digital asset, as used herein, is not limited to currency payments and, thus, may be completed through any suitable means including the various examples discussed above.

With continuing reference to FIG. 6, the user's personal computing device is redirected, e.g., via SDAM webpage/app, to a host site at eighth process block (208). For example, the user may be automatically forwarded to a members-only community experience site (e.g., NIKE®.SWOOSH) and presented with the next (final) steps for successfully acquiring a desired digital asset. In some instances, the host system may set the digital asset transfer to pending until a final approval is received from the PPP, as indicated at ninth process block (209). In accord with the illustrated example, the user may select or design a digital asset on the community experience site; however, before the user is allowed to take possession of the asset, their order is set as "pending" while the host system awaits successful receipt of payment through the PPP. To this end, the PPP may notify the host system that all procurement formalities are complete (e.g., STRIPE® notified NIKE® VPS payment went through), at tenth process block (210). As a direct response, the host system may transmit an automated alert at eleventh process block (211) to notify the user that their acquisition request was decisively approved. For instance, the user may be informed that the order was taken, payment was received, and their digital asset is being minted.

Advancing to twelfth process block (212) of FIG. 6, the BO host server computer and database system solicits the minting of an NFT for the select digital asset and, concomitantly, the secure storage of the NFT in a third-party custodial wallet. Continuing with the above example, a host VPS may submit an order to an NFT minting platform (e.g., HYPERMINT®) to create a new NFT for the desired digital asset and, once secured to an appropriate blockchain, transfer the NFT to an NFT-enabled custodial wallet registered to the user (e.g., a default BITGO® wallet). As part of the minting process, the NFT minting platform may generate or call-up a smart contract (e.g., to give token X to blockchain address Y), and solicit registration of the NFT on a decentralized blockchain ledger, as indicated at thirteenth process block (213). Upon registration, the private key for the newly minted NFT is transferred to a trusted Custodial Wallet Platform and securely stored in a respective NFT-enabled custodial wallet assigned to the subject user, as indicated at fourteenth process block (214). While shown as separate entities in FIG. 6, it is envisioned that the minting services, blockchain registration services, and/or crypto wallet services may be provided by a single entity.

After the requisite NFT is minted and securely stored, method 200 executes fifteenth process block (215) and automates transmission of a notification to the NFT minting platform that registration and transfer of the NFT is complete. As an extension, the NFT minting platform responsively automates transmission of a follow-on notification to the BO host server with confirmatory information that minting and wallet storage is complete, as indicated at sixteenth process block (216) of FIG. 6. At this juncture, a system-automated electronic communication is transmitted to the user to notify them that minting was successful, the requested digital asset has been assigned to the user, and the corresponding NFT is now secured in their personal crypto wallet, as indicated at seventeenth process block (217) of FIG. 6.

Figure 7:
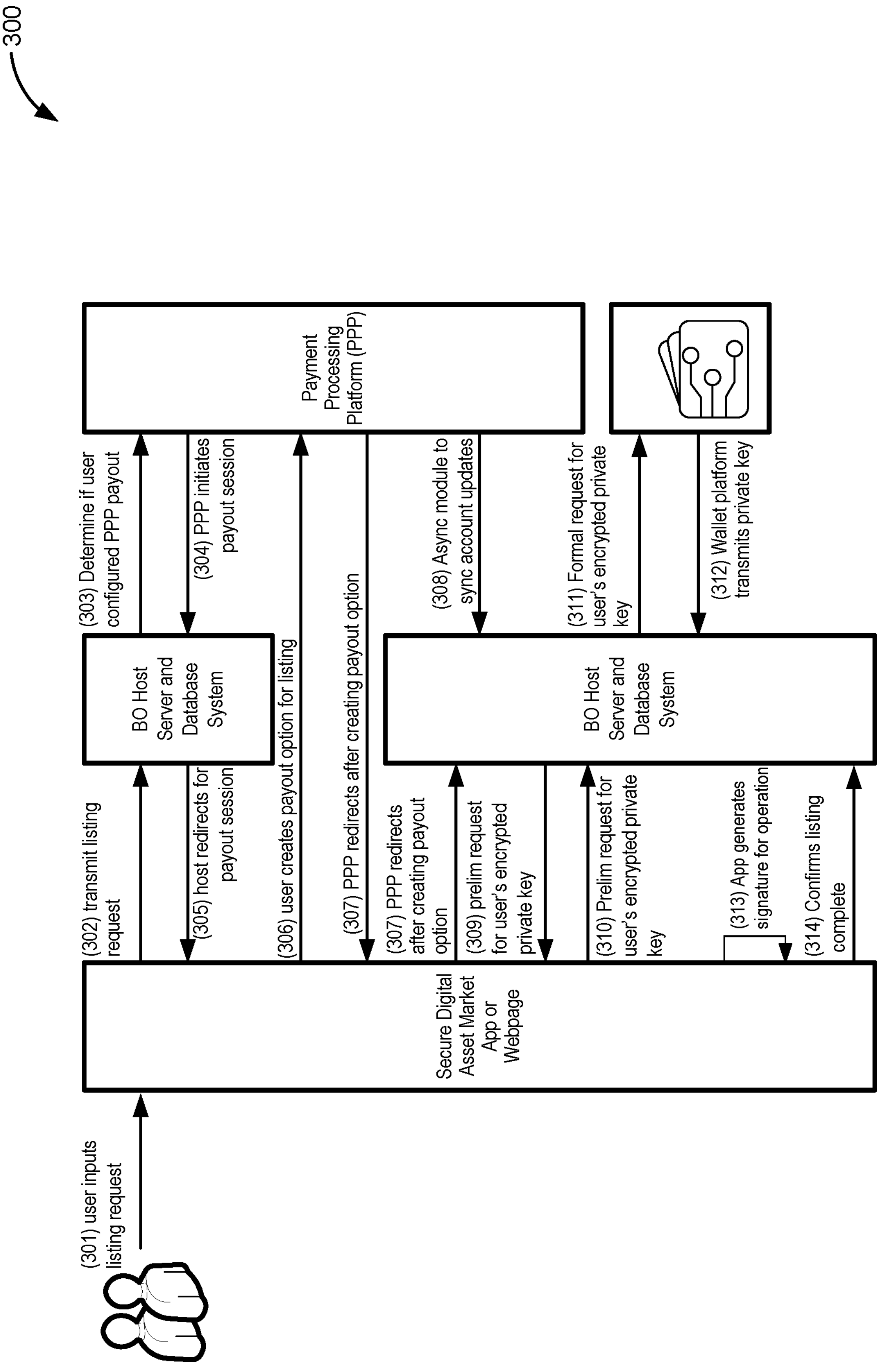
FIG. 7 is a flowchart illustrating a representative algorithm for listing for sale a cryptographic digital asset on a secondary sale digital marketplace website and the digital asset is stored in a custodial wallet hosted by a third-party platform, which may correspond to memory-stored instructions executed by programmable electronic control unit, logic circuitry, or other computer-based device or network of devices in accord with aspects of the disclosed concepts.

FIG. 7 is a flowchart illustrating a representative method 300 for listing a cryptographic digital asset for sale on a secondary sale digital marketplace using the E2E protocol service described above. With reference next to first process block (301) of FIG. 7, a user inputs a listing request to post a digital asset as available for transaction (e.g., sale from a first user to a second user). Continuing with the non-limiting examples of FIGS. 1-3, the user 11 may use their portable electronic device 39 to launch a dedicated software app (e.g., SNKRS®) or a web-based applet (e.g., NIKE+®) to communicate with a back-office host system 34, 68 to create a listing to sell a blockchain-secured cryptographic digital asset (e.g., NFT-secured digital shoe 44 of FIG. 2). After the user inputs a listing request, the Digital Asset Market webpage/app may generate and transmit to the back-office host service system a preliminary request to list the digital asset, as indicated at second process block (302) of FIG. 7. This subroutine may be an automated response to the user clicking or pressing a LIST NOW soft key.

Upon receipt of the preliminary listing request, the BO host server system may optionally determine whether or not the requesting user has configured a transaction account with a third-party transaction intermediary. By way of example, third process block (303) of FIG. 7 may include the BO host server system soliciting the PPP to confirm that the user has set up a payout account with the PPP. Responsive to determining that the requesting user has configured a transaction account, the third-party transaction intermediary may preliminarily initiate a transaction at fourth process block (304). For instance, the PPP may enable the user's transaction account to execute a respective payout session for the corresponding digital asset.

Responsive to determining that the requesting user has not configured a transaction account, the third-party transaction intermediary may preliminarily deny the requested transaction at fourth process block (304). In this instance, fifth process block (305) includes processor-executable instructions for the BO host system to redirect the user to configure a transaction account with the third-party transaction intermediary (e.g., SETUP NEW STRIPE ACCOUNT). To this end, the SDAM webpage/app may automatically route the user to the third-party transaction intermediary's site to create the requisite transaction account, as indicated at sixth process block (306). At this juncture, the user may enter the requisite personal identification information, banking information, etc., to create a payout account with the PPP. After creating the transaction account, the third-party transaction intermediary may redirect the user back to the SDAM webpage/app to complete the transaction posting for the digital asset, as indicated at seventh process block (307) (e.g., user leaves final setup screen on PPP site). To synchronize the user's transaction intermediary account with their SDAM webpage/app account, eighth process block (308) may provision an async utility module to operatively connect and coordinate interactions and updates between the two accounts.

With continuing reference to FIG. 7, method 300 advances to ninth process block (309) whereat the BO host server system prompts the user to provide the necessary security information to access their crypto wallet in light of requested listing transaction (e.g., ENTER WALLET PASSPHRASE FOR CONSENT). In response, the SDAM webpage/app executes tenth process block (310) and automates transmission of a secure preliminary request for the user's encrypted private key to the BO host server system. Using the requested security information embedded in the preliminary request, the BO host may concomitantly automate transmission of a secure formal request for the user's encrypted private key to the Custodial Wallet Platform, as indicated at eleventh process block (311). While illustrated in FIG. 7 as being routed indirectly through the BO host, the request for the user's encrypted private key may be solicited by the SDAM webpage/app directly from the Custodial Wallet Platform (i.e., circumventing NIKE® VPS and providing secure passphrase directly to BITGO®). After confirming the validity of the user's security information, the Custodial Wallet Platform responsively executes twelfth process block (312) and transmits the requested private key to the SDAM webpage/app, e.g., either directly or indirectly through the BO host. It is envisioned that one or more or all of process blocks 310-312 may be replaced by an open-source Web 3.0 protocol, such as WALLETCONNECT™, that connects blockchain-enabled crypto wallets with decentralized applications ("dapp").

After retrieving the user's encrypted private key, method 300 proceeds to thirteenth process block (313) and determines a signature for the requested listing transaction. For example, the SDAM webpage/app may employ any of the herein described MPC protocols and optional subroutines to generate a single-password custodial wallet signature using the private key. For at least some implementations, it is desirable that the BO host system be prevented from either accessing or possessing both the private key and the resultant signature throughout the transaction process. At fourteenth process block (314), the SDAM webpage/app automates transmission of an electronic alert to the BO host system confirming that the requested listing is complete.

Figure 8:
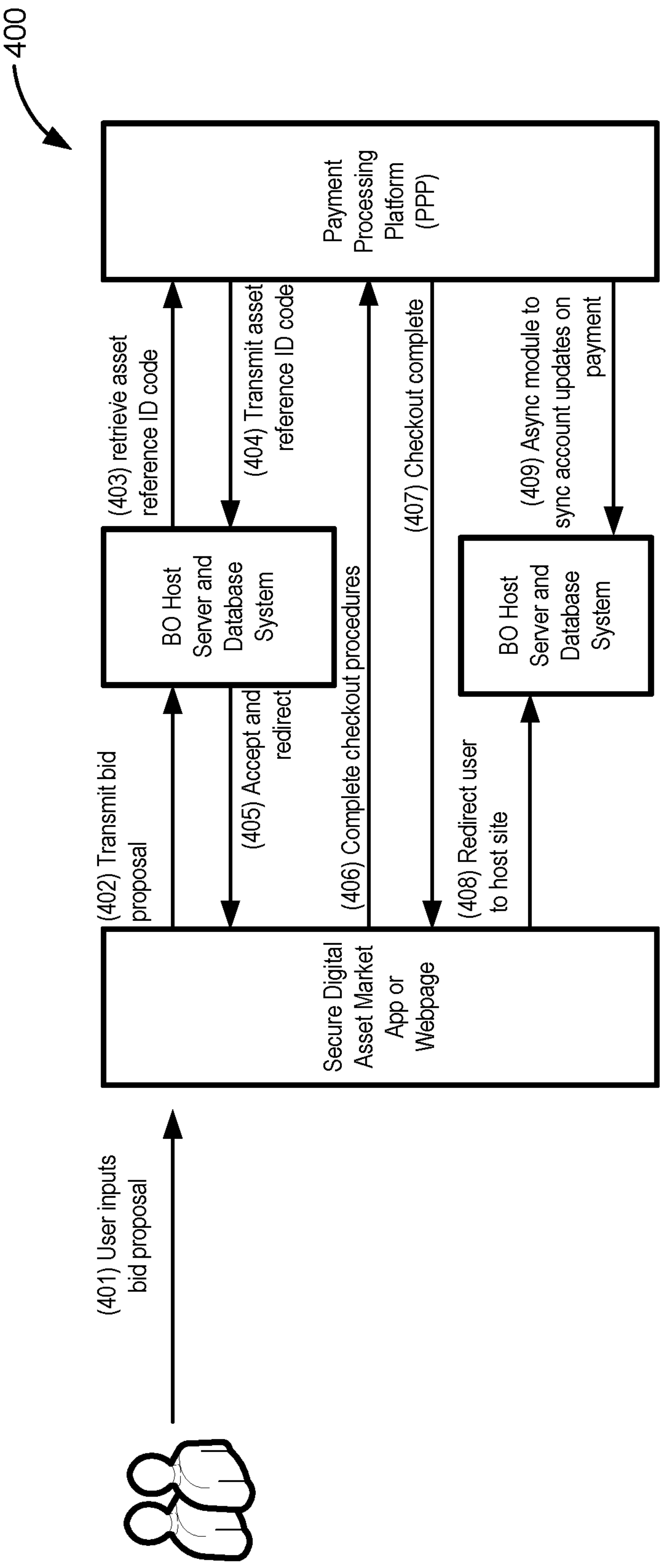
FIG. 8 is a flowchart illustrating a representative algorithm for bidding on a cryptographic digital asset listed for sale on a secondary sale digital marketplace website and the digital asset is stored in a custodial wallet hosted by a third-party platform, which may correspond to memory-stored instructions executed by programmable electronic control unit, logic circuitry, or other computer-based device or network of devices in accord with aspects of the disclosed concepts.

FIG. 8 is a flowchart illustrating a representative method 400 for bidding on and/or purchasing a cryptographic digital asset listed for sale on a secondary sale digital marketplace website using an E2E service protocol such as described above. After a digital asset is listed as available for transaction, e.g., using the method 300 of FIG. 7, another user may input a bid proposal to acquire the listed asset at first process block (401) of FIG. 8. A prospective buyer, for example, may access a posted asset listing using their own personal computing device; if desired, they may click/press a BUY NOW soft key option to purchase the asset. Upon receipt of the prospective user's input, the SDAM webpage/app may responsively automate transmission of a preliminary bid proposal to the BO host system at second process block (402). Using the information contained in this preliminary bid proposal, the BO host system may retrieve an asset reference identification code from the third-party transaction intermediary at third process block (403). In accord with the illustrated example, the NIKE® VPS may solicit a STRIPE® system server for a stripe-connect reference code for the desired payment target. In response, the third-party transaction intermediary transmits the requested asset reference ID code and any related transaction provisions to the BO host system at fourth process block (404) of FIG. 8.

Method 400 of FIG. 8 advances from fourth process block (404) to fifth process block (405), accepts the prospective user's bid proposal, and routes the prospective user to the third-party transaction intermediary to complete any preliminary transfer procedures. In a non-limiting example, the BO host system may confirm the bid proposal comports with a predefined set of transaction provisions stipulated by the user (e.g., at process block (301) in FIG. 7); once confirmed, the BO host transmits a hyperlink, URL, or an HTTP redirect to the prospective user's personal computing device via the SDAM webpage/app. The prospective user then proceeds to complete the checkout prompts presented by the PPP, as indicated at sixth process block (406). This may include the prospective user authorizing payment to the listing user via the PPP. Electronic notification that checkout was finalized may be output by the PPP at seventh process block (407).

After all necessary checkout procedures are properly completed, method 400 may execute eighth process block (408) and automatically redirect the prospective user to a host site and thereby coordinate transfer of the listed digital asset. Similar to process block (208) of FIG. 6, for example, the prospective buyer may be automatically forwarded to a members-only community experience site (e.g., NIKE®.SWOOSH) and presented with the next (final) steps for successfully obtaining the listed digital asset. In tandem, ninth process block (409) may provision an async utility module to operatively connect and coordinate interactions and updates between the listing user's account and the prospective user's account.

Figure 9:
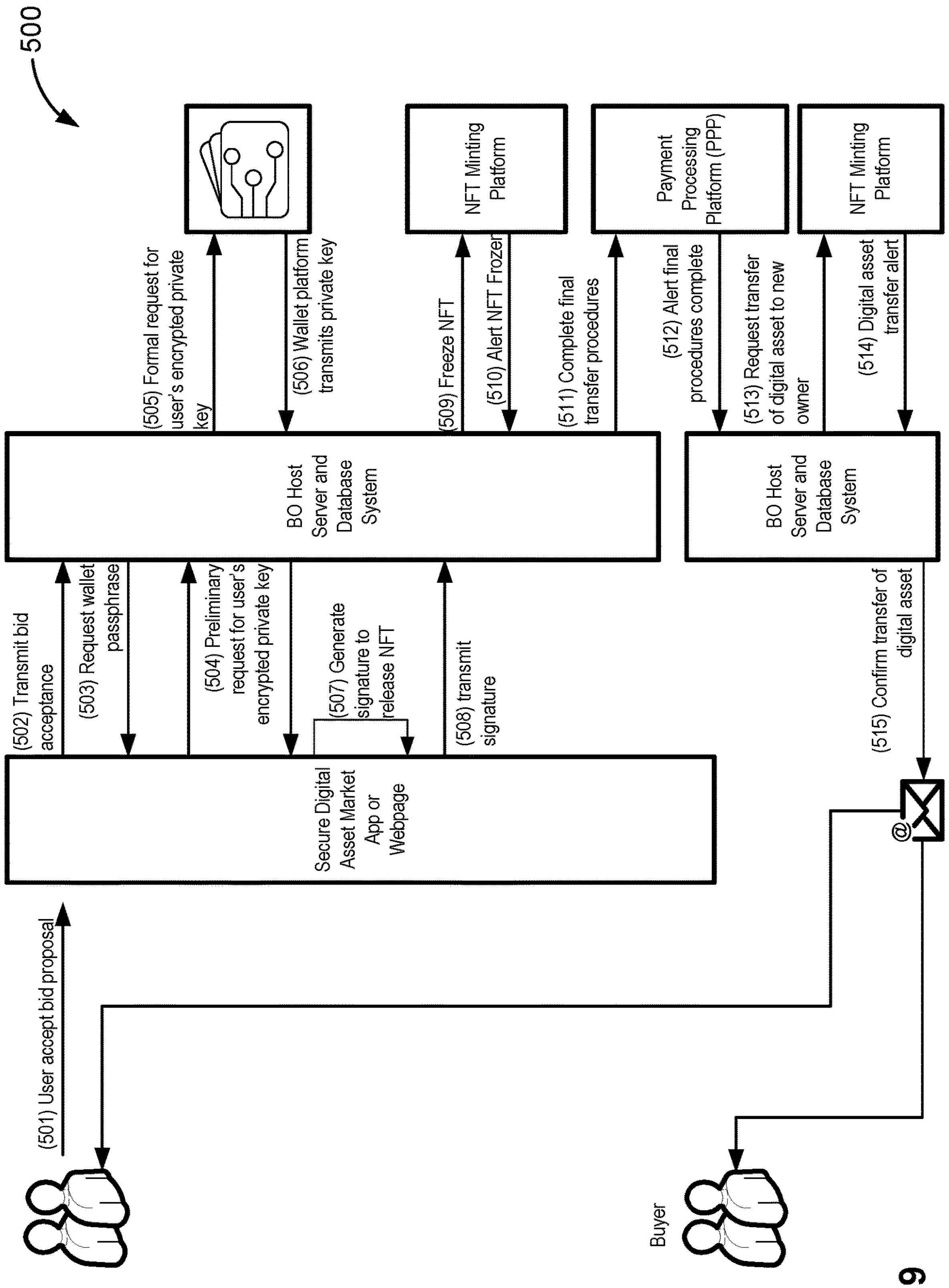
FIG. 9 is a flowchart illustrating a representative algorithm for accepting a bid for a cryptographic digital asset listed for sale on a secondary sale digital marketplace website and the digital asset is stored in a custodial wallet hosted by a third-party platform, which may correspond to memory-stored instructions executed by programmable electronic control unit, logic circuitry, or other computer-based device or network of devices in accord with aspects of the disclosed concepts.

FIG. 9 is a flowchart illustrating a representative method 500 of a user accepting a bid for a cryptographic digital asset listed for sale on a secondary sale digital marketplace website using an E2E service protocol as described above. With reference to the method 500 of FIG. 9, the listing user may input a selection to accept the prospective user's bid proposal at first process block (501). Accepting a bid proposal may merely require the listing user to review the bid proposal on the SDAM webpage/app and, if acceptable, click/press an ACCEPT BID soft key option to agree to the bid price submitted by the prospective user. In response to receipt of the listing user's bid acceptance, the SDAM webpage/app executes second process block (502) and automates output of an electronic notification to the host system indicating a preliminary acceptance of the bid proposal. To proceed with the bid acceptance process, the BO host system may prompt the listing user to provide the necessary security information to access their crypto wallet for the requested listing transaction (e.g., ENTER WALLET PASSPHRASE), as indicated at third process block (503). In response, the SDAM webpage/app executes fourth process block (504) and automates transmission of a secure preliminary request for the user's encrypted private key to the BO host server system.

Using security credentials embedded in the preliminary request, the BO host may concomitantly automate transmission of a secure formal request for the user's encrypted private key to the Custodial Wallet Platform, as indicated at fifth process block (505). It is envisioned that the request for the user's encrypted private key may be solicited by the SDAM webpage/app either indirectly (as shown) or directly from the Custodial Wallet Platform. The Custodial Wallet Platform may confirm the validity of the user's security credentials and responsively execute sixth process block (506) to transmit the requested private key to the SDAM webpage/app. Similar to process blocks 310-312, it is envisioned that one or more or all of process blocks 503-506 may be replaced by an open-source Web 3.0 protocol (e.g., WALLETCONNECT™) that connects blockchain-enabled crypto wallets with decentralized applications.

Upon receipt of the listing user's encrypted private key, method 500 of FIG. 9 proceeds to seventh process block (507) and determines a signature for the requested listing transaction. As shown, the SDAM webpage/app may employ a Threshold Signature Scheme protocol to generate a single digital signature from multiple independent signatories for an MPC wallet. Using a predefined group of n users $P_1, \ldots, P_n$. A (t, n), the TSS protocol enables a subgroup of any t+1 users to jointly approve and generate a signature. Once generated, the SDAM webpage/app transmits the signature to the BO host system at eight process block (508); upon receipt of the signature, the BO host system transmits a request to freeze the listed digital asset at ninth process block (509). By way of example, and not limitation, the BO host system may transmit an NFT PARK DEMAND to the NFT minting platform and/or the custodial wallet platform in order to prevent the listing user from attempting to sell the same digital asset more than one time. At tenth process block (510), a freeze confirmation notification is transmitted to the BO host system.

Prior to, contemporaneous with, or after process blocks (509) and (510), method 500 may execute the programmable memory-stored instructions of eleventh process block (511) with a secure request for the third-party transaction intermediary to complete any final transfer procedures (e.g., prompt PPP to LET PAYMENT THROUGH). At twelfth process block (512) of FIG. 9, the third-party transaction intermediary automates output of an alert to the BO host system with an indication that the final transfer procedures are now complete (e.g., PPP notifies BO when payment successfully processed). Upon confirmation of completion, the BO host system responsively executes thirteenth process block (513) and automates a request to the NFT minting platform and/or the custodial wallet platform to transfer the digital asset from the listing user (present owner) to the bidding user (new owner). Transfer of a digital asset may entail identifying a public recipient address of an NFT-enabled digital wallet of the bidding user, transferring the encrypted private key of the NFT from the listing user's custodial wallet to the bidding user's digital wallet, payment of any attendant gas fees, and recording the transfer to a suitable blockchain ledger. At fourteenth process block (514), the minting platform/custodial wallet platform notifies that BO host system that the digital asset has been successfully transferred; the BO host system concomitantly transmits electronic confirmation to the buyer and seller that the digital asset has been successfully transferred, as indicated at fifteenth process block (515).

As previously noted, FIG. 5 presents an improved method 100 for providing consumer interactions with custodial digital wallet services provided by a third-party platform for blockchain-enabled digital assets through a web browser or a dedicated app in communication with a host platform. FIG. 6 illustrates a representative method 200 for a primary sale of a cryptographic digital asset on a primary digital marketplace website and secure storage of that digital asset in a custodial wallet hosted by a third-party platform. The flow chart of FIG. 7 presents an improved 300 method or control strategy for listing a cryptographic digital asset for purchase, exchange, transfer, etc. (collectively "transaction"). In addition, FIG. 8 presents an improved method 400 for bidding on a cryptographic digital asset that is listed for transaction. Lastly, FIG. 9 presents an improved method 500 for accepting a bid for a cryptographic digital asset that is listed for transaction. The process blocks, options, and features described with respect to the methods 100, 200, 300, 400 and/or 500 of FIGS. 5-9 may be incorporated into a single algorithm or module, and may represent use cases of the system, architecture, and methods outlined in connection with FIG. 4. Likewise, some or all of the operations illustrated in FIGS. 5-9 may be representative of algorithms that correspond to programmable instructions that may be stored in memory and executed by a controller, CPU, processor, logic circuit, or other module or device or network of devices to perform the herein described functions associated with the disclosed concepts. Moreover, the order of execution of the process blocks may be changed, additional blocks may be added, and some of the blocks may be modified, combined, or eliminated.

Aspects of this disclosure may be implemented, for example, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input(s). The software may also cooperate with other code segments to initiate a variety of tasks in response to data received in conjunction with the source of the received data. The software may be stored on any of a variety of memory media, such as CD-ROM, magnetic disk, solid-state drive (SSD), hard-disk drive (HDD), and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

As noted in the disclosure, the present system may utilize public or private blockchain infrastructures, distributed ledgers, append-only databases, and the like. In one example, the presently described cryptographically secured digital assets may initially be stored/secured to a private blockchain that resides on infrastructure maintained by a single entity, or consortium of entities. Each entity may agree upon a common form, or data construct for the infrastructure, though assets of any one entity may be maintained by that entity. Such a model may provide for the sharing of network and infrastructure costs/resources, while permitting each entity to maintain their own asset independence. To further public trust, assets created on this private or semi-private blockchain may be transferrable to public chains at the discretion of the user (potentially subject to one or more conditions of transfer).

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a CD-ROM, a solid-state drive (SSD) device, a hard-disk drive (HDD) device, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms are described with reference to flowcharts depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

Embodiments of the present disclosure are provided in the following enumerated clauses, which should be read in light of the preceding disclosure and explanation of the technology.

Clause 1: A method for governing control of digital assets, the method comprising: receiving, over a distributed computing network via a host server of a host platform from a personal computing device of a user, a transfer request to transfer a cryptographic digital asset from a custodial wallet provisioned by a third-party wallet platform; receiving, via the host server from a third-party server of the third-party wallet platform responsive to receiving the transfer request, an encrypted private key enabling access to the custodial wallet; determining a decrypted private key by decrypting the encrypted private key using a passphrase input by the user; determining, using the decrypted private key, an encrypted transfer request by generating a verified transfer request to transfer the cryptographic digital asset from the custodial wallet to a new digital wallet and encrypting the verified transfer request; and transmitting, via the host server to the third-party server using the encrypted transfer request, a transfer order to transfer the cryptographic digital asset from the custodial wallet to the new digital wallet.

Clause 2: The method of clause 1, further comprising: receiving, via the host server from the third-party server, an unencrypted public key corresponding to the private key and enabling transfers with the custodial wallet; and generating, via the host server, the transfer order using the unencrypted public key.

Clause 3: The method of clause 2, further comprising determining a decrypted transfer request by decrypting the encrypted transfer request using the unencrypted public key for the custodial wallet.

Clause 4: The method of clause 3, further comprising retrieving, via the host server, select message content within the decrypted transfer request, wherein the transfer order is generated using the retrieved select message content.

Clause 5: The method of clause 1, wherein the transfer order includes a smart contract assigning ownership of a unique digital token of the cryptographic digital asset to a new user of the new digital wallet.

Clause 6: The method of clause 1, wherein determining the decrypted private key and determining the encrypted transfer request is via a software application operating on the personal computing device of the user.

Clause 7: The method of clause 6, further comprising transmitting the encrypted transfer request from the software application on the personal computing device to the host server of the host platform.

Clause 8: The method of clause 7, wherein the transfer request and the passphrase are received from the user via the software application operating on the personal computing device.

Clause 9: The method of clause 7, wherein the encrypted private key is received by and passed through the host server to the software application without the host server taking custodial possession of or accessing the encrypted private key.

Clause 10: The method of clause 1, wherein the encrypted private key is encrypted by parsing, using a secure multi-party computation (MPC) cryptographic protocol, the encrypted private key into multiple encrypted key shares and distributing each of the encrypted key shares to a respective party within a constrained set of parties.

Clause 11: The method of clause 10, wherein decrypting the encrypted private key includes executing a secret sharing function of the MPC during which some, but not all, of the encrypted key shares are shared amongst the respective parties within the constrained set of parties and at least a predefined minimum number of the respective parties with the encrypted key shares approves the decryption.

Clause 12: The method of clause 10, wherein the secure MPC cryptographic protocol includes a multilayer decentralized MPC (dMPC) protocol with a Layer 2 blockchain on which is recorded possession information, transaction records, and governance approvals of the encrypted key shares of the parsed encrypted private key.

Clause 13: The method of clause 10, wherein the secure MPC cryptographic protocol includes a Threshold Signature Scheme (TSS) protocol for generating a single digital signature from respective signature segments provided by the respective parties with the encrypted key shares.

Clause 14: A decentralized computing system for governing control of digital assets, the decentralized computing system comprising: a software application operable on a personal computing device of a user; a communications device configured to connect to a third-party server of a third-party wallet platform over a distributed computing network; and a server computer operatively connected to the software application and the third-party wallet platform via the communications device, the server computer being programmed to: receive, over the distributed computing network from the software application, a transfer request to transfer a cryptographic digital asset from a custodial wallet provisioned by the third-party wallet platform; receive, over the distributed computing network from the third-party server of the third-party wallet platform responsive to receiving the transfer request, an encrypted private key enabling access to the custodial wallet; determine, via the software application, a decrypted private key by decrypting the encrypted private key using a passphrase input by the user; determine, via the software application using the decrypted private key, an encrypted transfer request by generating a verified transfer request to transfer the cryptographic digital asset from the custodial wallet to a new digital wallet and encrypting the verified transfer request; and transmit, to the third-party server using the encrypted transfer request, a transfer order to transfer the cryptographic digital asset from the custodial wallet to the new digital wallet.

Clause 15: A non-transitory computer-readable medium storing instructions executable by a host server of a host platform or a software application operating on a personal computing device of a user, the stored instructions, when executed, causing the host server or the software application to perform operations comprising: receiving, over a distributed computing network via the host server from the software application, a transfer request to transfer a cryptographic digital asset from a custodial wallet provisioned by a third-party wallet platform; receiving, via the host server from a third-party server of the third-party wallet platform responsive to receiving the transfer request, an encrypted private key enabling access to the custodial wallet; determining, via the software application, a decrypted private key by decrypting the encrypted private key using a passphrase input by the user; determining, via the software application using the decrypted private key, an encrypted transfer request by generating a verified transfer request to transfer the cryptographic digital asset from the custodial wallet to a new digital wallet and encrypting the verified transfer request; and transmitting, via the host server to the third-party server using the encrypted transfer request, a transfer order to transfer the cryptographic digital asset from the custodial wallet to the new digital wallet.

Clause 16: The computer-readable medium of clause 15, wherein the stored instructions further cause the host server to receive, from the third-party server, an unencrypted public key enabling transfers with the custodial wallet, wherein transmitting the transfer order is further based on the unencrypted public key.

Clause 17: The computer-readable medium of clause 16, wherein the stored instructions further cause the host server to determine a decrypted transfer request by decrypting the encrypted transfer request using the unencrypted public key for the custodial wallet.

Clause 18: The computer-readable medium of clause 17, wherein the stored instructions further cause the host server to: retrieve select message content within the decrypted transfer request; and generate the transfer order using the retrieved select message content.

Clause 19: The computer-readable medium of clause 15, wherein the stored instructions further cause the software application to transmit the encrypted transfer request to the host server of the host platform.

Clause 20: The computer-readable medium of clause 15, wherein the transfer request and the passphrase are received from the user via the software application operating on the personal computing device.

Clause 21: The computer-readable medium of clause 15, wherein the encrypted private key is received by and passed through the host server to the software application without the host server taking custodial possession of or accessing the encrypted private key.

Clause 22: The computer-readable medium of clause 15, wherein the encrypted private key is encrypted by parsing, using a secure multi-party computation (MPC) cryptographic protocol, the encrypted private key into multiple encrypted key shares and distributing each of the encrypted key shares to a respective party within a constrained set of parties.

Clause 23: The computer-readable medium of clause 22, wherein decrypting the encrypted private key includes executing a secret sharing function of the MPC during which some, but not all, of the encrypted key shares are shared amongst the respective parties within the constrained set of parties and at least a predefined minimum number of the respective parties with the encrypted key shares approves the decryption.

Clause 24: The computer-readable medium of clause 23, wherein the secure MPC cryptographic protocol includes a multilayer decentralized MPC (dMPC) protocol with a Layer 2 blockchain on which is recorded possession information, transaction records, and governance approvals of the encrypted key shares of the parsed encrypted private key.

Clause 25: The computer-readable medium of clause 23, wherein the secure MPC cryptographic protocol includes a Threshold Signature Scheme (TSS) protocol for generating a single digital signature from respective signature segments provided by the respective parties with the encrypted key shares.

What is claimed:

1. A system for facilitating user interaction with custodial digital wallets, the system comprising:

a user device executing a software application; and a server computer of a host platform, the server computer configured to:

maintain a plurality of user accounts;

receive, from a first user account of the plurality of user accounts, a request to interact with a custodial wallet provisioned by a third-party wallet platform, wherein the custodial wallet is associated with the first user account and is configured to store at least one blockchain-based digital asset; and in response to receiving the request, facilitate communication between the user device associated with the first user account and a server of the third-party wallet platform using an end-to-end encrypted (E2E) protocol, wherein the server computer of the host platform does not have access to a private key associated with the custodial wallet;

wherein the server computer is further configured to facilitate the communication by:

receiving an encrypted private key from the third-party wallet platform, transmitting the encrypted private key to the user device;

receiving an encrypted transfer request from the user device; and transmitting a transfer order based on the encrypted transfer request to the third-party wallet platform; and wherein the software application executing on the user device is configured to:

receive the encrypted private key from the server computer;

decrypt the encrypted private key using a user-provided passphrase;

generate the encrypted transfer request using the decrypted private key; and transmit the encrypted transfer request to the server computer.

2. The system of claim 1, wherein the server computer is further configured to:

enable the first user account to be linked to a user account on a partner platform; and in response to a request to unlock the at least one digital asset for use on the partner platform:

verify the first user account's ownership of or right to use the digital asset;

generate an unlock code associated with the digital asset; and transmit the unlock code to the partner platform, wherein the partner platform, upon receiving the unlock code, grants access to a corresponding digital asset within the partner platform's system.

3. The system of claim 2, wherein the server computer is further configured to:

maintain a badge system for managing one-time use rights across platforms, wherein the E2E protocol comprises:

routing all private key operations through a browser-based application or dedicated software application on the user device;

performing decryption operations exclusively on the user device; and deleting all decrypted information from the user device after generating the encrypted transfer request;

associate the unlock code with a digital badge; and deactivate the digital badge after transmitting the unlock code.

4. The system of claim 1, wherein the server computer is further configured to interface with the third-party wallet platform using a secure multi-party computation (MPC) protocol that:

parses the encrypted private key into multiple encrypted key shares;

distributes the encrypted key shares among a plurality of parties; and requires approval from a threshold number of parties to perform cryptographic operations.

5. The system of claim 4, wherein the server computer is further configured to interface with the third-party wallet platform such that the MPC protocol includes a threshold signature scheme (TSS) that:

divides signing responsibilities among the plurality of parties;

generates signature segments from respective parties; and combines the signature segments to create a single valid digital signature.

6. The system of claim 1, wherein the host platform is associated with a consumer brand, and wherein the server computer is further configured to:

enable users to view, trade, and utilize blockchain-based digital assets associated with the consumer brand;

absorb transaction costs associated with blockchain operations; and maintain separation between the consumer brand and custodial control of the digital assets.

7. A method for facilitating a user-initiated transfer of a digital asset from a custodial wallet using an intermediary platform, the method comprising:

receiving, by a server computer of a host platform, a transfer request from a first user account to transfer a digital asset from a custodial wallet provisioned by a third-party wallet platform to a different digital wallet, wherein the custodial wallet is associated with the first user account;

in response to receiving the request, facilitating, by the server computer, communication between a user device associated with the first user account and a server of the third-party wallet platform using an end-to-end encrypted (E2E) protocol, wherein the host platform does not have access to a private key associated with the custodial wallet;

receiving, by a software application executing on the user device, an encrypted private key associated with the custodial wallet from the third-party wallet platform;

decrypting, by the software application, the encrypted private key using a passphrase input by a user associated with the first user account;

generating, by the software application, an encrypted transfer request using the decrypted private key;

transmitting, by the software application, the encrypted transfer request to the server computer; and transmitting, by the server computer, a transfer order based on the encrypted transfer request to the third-party wallet platform to transfer the digital asset from the custodial wallet to the different digital wallet.

8. The method of claim 7, further comprising receiving, by the server computer, an unencrypted public key associated with the custodial wallet from the server of the third-party wallet platform.

9. The method of claim 8, further comprising using, by the server computer, the unencrypted public key to facilitate generation of the transfer order.

10. The method of claim 7, further comprising:
verifying, by the server computer, compliance with rule sets established by both the host platform and the third-party wallet platform before transmitting the transfer order.

11. The method of claim 7, wherein the third-party wallet platform utilizes a secure multi-party computation (MPC) protocol or a threshold signature scheme (TSS) to manage the private key associated with the custodial wallet.

12. The method of claim 7, further comprising:
storing the digital asset in association with metadata that defines one or more characteristics of the digital asset;
maintaining synchronization between the metadata and corresponding NFT attributes recorded on a blockchain;
tracking usage of the digital asset across multiple platforms; and
preventing concurrent use of the digital asset and a corresponding NFT on the blockchain.

* * * * *